United States Patent
Matsuda et al.

(10) Patent No.: US 8,392,004 B2
(45) Date of Patent: Mar. 5, 2013

(54) AUTOMATIC AUDIO ADJUSTMENT

(75) Inventors: Ken Matsuda, Sunnyvale, CA (US); Conner Richardson, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 949 days.

(21) Appl. No.: 12/433,873

(22) Filed: Apr. 30, 2009

(65) Prior Publication Data

US 2010/0280638 A1   Nov. 4, 2010

(51) Int. Cl.
    *G06F 17/00* (2006.01)
(52) U.S. Cl. .......................................... 700/94
(58) Field of Classification Search .................. 700/94; 704/500–504
    See application file for complete search history.

(56) References Cited

U.S. PATENT DOCUMENTS

| | | | |
|---|---|---|---|
| 6,150,598 A | 11/2000 | Suzuki et al. | |
| 6,184,937 B1 | 2/2001 | Williams et al. | |
| 6,317,776 B1 | 11/2001 | Broussard et al. | |
| 6,337,947 B1 | 1/2002 | Porter et al. | |
| 6,365,817 B1 | 4/2002 | Suzuki et al. | |
| 6,392,135 B1 | 5/2002 | Kitayama | |
| 6,628,303 B1 | 9/2003 | Foreman et al. | |
| 6,674,955 B2 | 1/2004 | Matsui et al. | |
| 6,967,599 B2 | 11/2005 | Choi et al. | |
| 6,968,564 B1 | 11/2005 | Srinivasan | |
| 7,072,477 B1 | 7/2006 | Kincaid | |
| 7,142,250 B1 | 11/2006 | Black | |
| 7,225,405 B1 * | 5/2007 | Barrus et al. ................. | 715/716 |
| 7,319,764 B1 | 1/2008 | Reid et al. | |
| 7,383,509 B2 | 6/2008 | Foote et al. | |
| 7,821,574 B2 | 10/2010 | Black | |
| 7,945,142 B2 | 5/2011 | Finkelstein et al. | |
| 8,006,195 B1 | 8/2011 | Woodings et al. | |
| 2002/0143545 A1 | 10/2002 | Tamura et al. | |
| 2004/0120554 A1 | 6/2004 | Lin et al. | |
| 2004/0122662 A1 | 6/2004 | Crockett | |
| 2004/0151469 A1 | 8/2004 | Engholm et al. | |
| 2004/0264714 A1 | 12/2004 | Lu et al. | |
| 2005/0042591 A1 | 2/2005 | Bloom et al. | |
| 2007/0121966 A1 * | 5/2007 | Plastina et al. ................. | 381/104 |
| 2008/0039964 A1 * | 2/2008 | Charoenruengkit et al. ... | 700/94 |
| 2008/0080721 A1 | 4/2008 | Reid et al. | |
| 2008/0256136 A1 * | 10/2008 | Holland ......................... | 707/200 |
| 2009/0103752 A1 * | 4/2009 | Chou et al. .................... | 381/107 |

(Continued)

FOREIGN PATENT DOCUMENTS

WO   WO 2008/002803   1/2008

OTHER PUBLICATIONS

Simon Haykin and Barry Van Veen, Signals and Systems 198 (Bill Zobrist ed., John Wiley & Sons, Inc. 1999).*

(Continued)

*Primary Examiner* — Andrew C Flanders
(74) *Attorney, Agent, or Firm* — Blakely, Sokoloff, Taylor & Zafman LLP

(57) ABSTRACT

A method and apparatus for editing recorded sounds. The method and apparatus provides representations of audio clips. The method and apparatus provides a set of user interface tools for selecting a source audio clip and a target audio clip. The user interface tools determine a maximum voice volume of each clip. Based on the maximum voice volumes, the user interface tools adjust the volume of the target audio clip. The adjustment changes the maximum voice volume of the target audio clip to match the maximum voice volume of the first audio clip.

25 Claims, 23 Drawing Sheets

U.S. PATENT DOCUMENTS

2011/0013084 A1  1/2011  Black

OTHER PUBLICATIONS

Author Unknown, "Frame-specific editing with Snap", Adobe Premiere Pro CS4 Classroom in a Book, Dec. 17, 2008, 17 pages, Adobe Press, USA.

U.S. Appl. No. 13/226,244, filed Sep. 6, 2011, Eppolito, Aaron M.

Portions of prosecution history of U.S. Appl. No. 10/407,954, mailed Jul. 20, 2006, Black, Robert David.

Portions of prosecution history of U.S. Appl. No. 11/561,885, mailed Sep. 20, 2010, Black, Robert David.

Portions of prosecution history of U.S. Appl. No. 12/886,561, mailed Jul. 6, 2012, Black, Robert David.

Author Unknown, "iMovie '08 Getting Started," Month Unknown, 2008, pp. 1-50, Apple Inc., California, USA.

Author Unknown, "Using Adobe Premiere Elements 8 Editor," Last Updated Aug. 12, 2010, 313 pages, Adobe Systems Incorporated, San Jose, California, USA.

Author Unknown, "Adobe Premiere Pro CS3: User Guide," Apr. 1, 2008, pp. 182-215, Adobe Systems Incorporated, San Jose, California, USA.

* cited by examiner

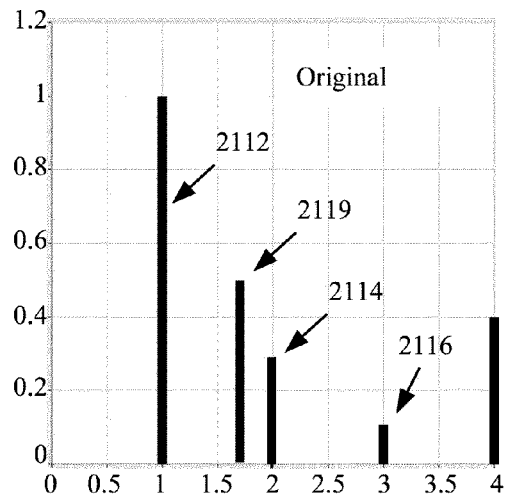
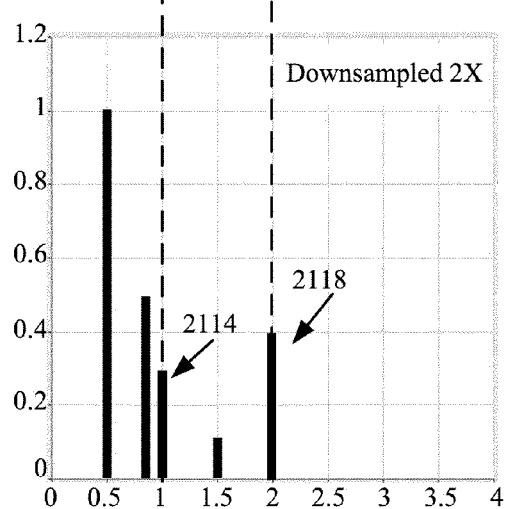
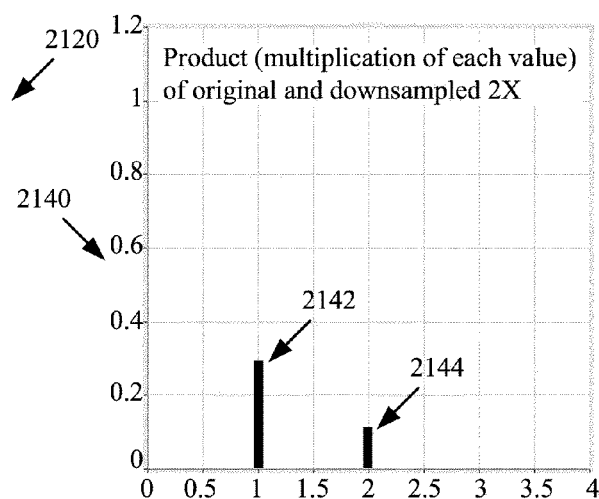
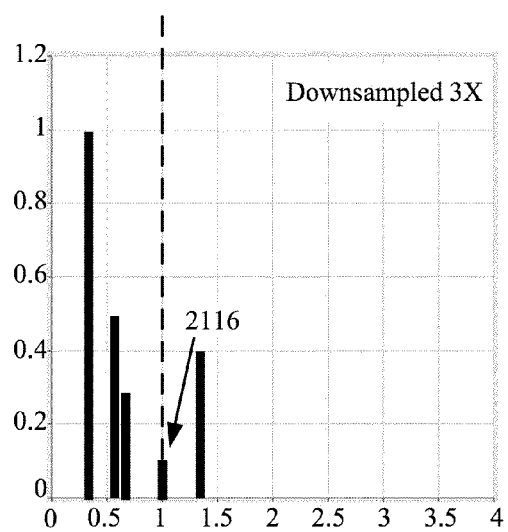
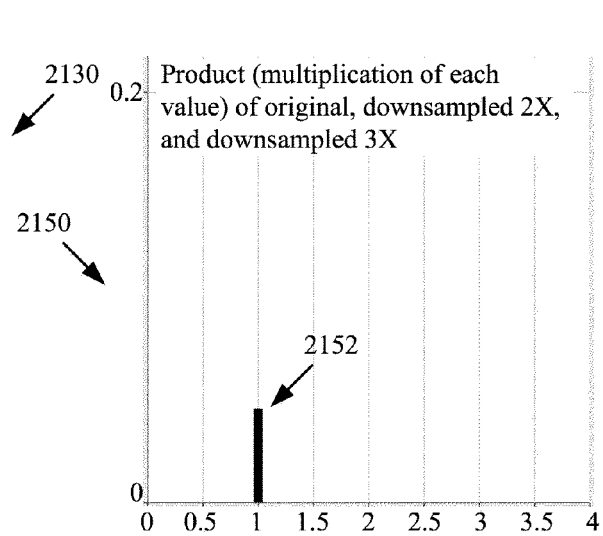
*Figure 21*
Harmonic product spectrum method

AUTOMATIC AUDIO ADJUSTMENT

FIELD OF THE INVENTION

The present invention relates to an editing tool that automatically adjusts the volume of a target audio clip in accord with a sample audio clip.

BACKGROUND OF THE INVENTION

Creators of audio and audio-visual productions (such as movies and television shows) often make an audio recording of the same scene multiple times or with multiple audio recording instruments. In many instances, the final audio version used in a movie or other audio-visual production is a composite of multiple separate recordings. The intent in making such a composite is to create an audio recording that appears to an audience to have been recorded at the same time. In order to maintain the appearance that the audio recording is a continuous recording, the volume level of the voices in each clip that makes up the audio recording should be the same. However, separate recordings often have separate recording volume levels, making the voices and other recorded sounds of one clip louder than the recorded sounds of another clip even when the original voices were at the same volume when each clip was recorded.

While it is possible to adjust the volume of a clip so that the maximum volume of that clip is the same as the maximum volume of another clip, this can lead to undesirable results. Such undesirable results may occur when the volume of a clip that has a loud, non-voice sound is adjusted to match the volume of a clip that only has voice sounds. Examples of non-voice sounds include explosions and other sounds produced by special effects. Such additional sounds make an adjustment of the volume based on the maximum volume of two audio clips undesirable. Adjusting the maximum volume of a target clip that includes the sound of an explosion to match the maximum volume of a sample clip that only includes people talking would make the explosion on the target clip as quiet as the voices on the sample clip. The voices on the target clip would be even softer because they would be reduced proportionately to the reduction in the sound of the explosion. Thus, there is a need for an audio editor application that can effectively adjust the volume of a target clip in accord with the volume of voices on a sample clip.

SUMMARY OF THE INVENTION

Some embodiments of the invention provide a media editing application that provides an automated volume adjustment tool that adjusts the volume level of a target media clip based on the volume level of particular types of sounds in a sample media clip. In particular, some embodiments adjust the volume of target clips based on the relative loudness of voices on the target and sample clips (e.g., comparison of maximum amplitudes or maximum power of frequencies characteristic of human voices).

In some such embodiments, the tool identifies the maximum voice level of a sample media clip that is selected by a user. When a user then identifies a target media clip, the tool (1) identifies the maximum voice level of the target media clip, (2) computes an adjustment factor based on the identified maximum voice levels of the sample and target media clips, and (3) adjusts the volume of the target clip based on the computed adjustment factor. This adjustment in some embodiments ensures that the maximum volume of the voices in the target media clip matches the maximum volume of the voices in the sample media clip, even though the maximum overall volume of the target clip is not the same as the maximum overall volume after the adjustment.

Some embodiments analyze clips by (1) converting the time domain representation of the sounds in the clips to a frequency domain representation of the sounds in the clips, (2) analyzing the frequency domain representations of the clips to identify harmonic frequencies in the human vocal range, and (3) determining the maximum amplitude of the identified frequencies. Converting the time domain representation to a frequency domain representation is done in some embodiments with a fast Fourier transform.

Some embodiments use such analysis to determine the maximum voice volume of selected sample clips, and then use similar analysis to determine the maximum volume of selected target clips. Once a sample clip and target clip have been analyzed, the application of some embodiments computes a ratio of the maximum voice volume levels of the clips and multiplies the volume of the target clip by that ratio. In some embodiments, this multiplication is performed on the frequency domain representation of the target clip. In such embodiments, the edited frequency domain representation of the target clip is then converted into a time domain representation of the edited target clip. In some embodiments, this conversion is done by an inverse fast Fourier transform.

In some embodiments, multiple target clips can be adjusted using the data derived from a single analysis of a sample clip. Some embodiments also provide a tool for storing the maximum voice volume level of an analyzed sample clip as a preset. Such embodiments then allow such presets to be used to adjust the target clip in lieu of a fresh analysis of a sample clip. Many embodiments are described in the detailed description, below.

BRIEF DESCRIPTION OF THE DRAWINGS

The novel features of the invention are set forth in the appended claims. However, for purpose of explanation, several embodiments of the invention are set forth in the following figures.

FIG. 21 illustrates the identification of harmonic frequencies.

DETAILED DESCRIPTION OF THE INVENTION

Figure 1:
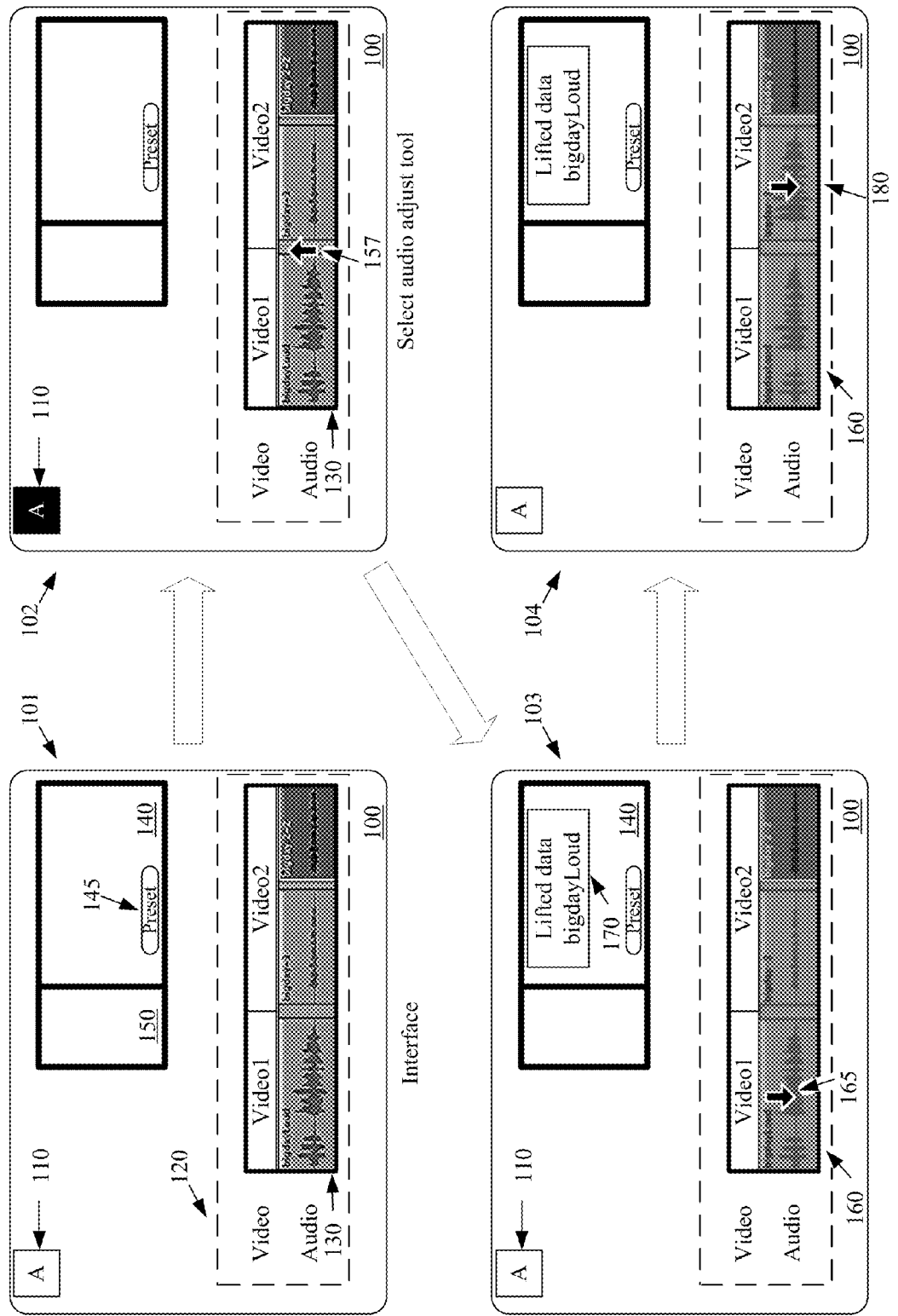
FIG. 1 illustrates a graphical user interface ("GUI") of a media editing application with an automated volume adjustment feature.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a media editing application that provides an automated volume adjustment tool that adjusts the volume level of a target media clip based on the volume level of particular types of sounds in a sample media clip. In some embodiments, this tool performs this adjustment by comparing the relative levels of voice data in the sample and target media clips. For instance, in some such embodiments, the tool identifies the maximum voice level of a sample media clip that is selected by a user. When a user then identifies a target media clip, the tool (1) identifies the maximum voice level of the target media clip, (2) computes an adjustment factor based on the identified maximum voice levels of the sample and target media clips, and (3) adjusts the volume of the target clip based on the computed adjustment factor. This adjustment in some embodiments ensures that the maximum volume of the voices in the target media clip matches the maximum volume of the voices in the sample media clip.

As used in this application, the term "media clips" can refer to any kind of clip that includes stored sound information. Examples of such clips include audio clips and video clips with audio content. The audio clips edited by some embodiments are the audio portions of clips that include both audio and visual information. Though the specification refers to audio clips for convenience, one of ordinary skill in the art will realize that the embodiments described herein also work with audio portions of media clips that also contain video data. Also, as used in this application, the term "lifting" refers to the process of identifying the maximum voice volume level in a sample clip, while the term "stamping" refers to the process of (1) identifying the maximum voice level of a target media clip, (2) computing an adjustment factor based on the identified maximum voice levels of the sample and target media clips, and (3) adjusting the volume of the target clip based on the computed adjustment factor.

As used herein, the term "audio adjustment tool" (sometimes referred to as "audio adjustment user interface tool") refers collectively to the elements of the media editing application that facilitate the audio adjustment operation. For instance, in some embodiments, an audio adjustment tool includes user interface (UI) items, indicator items, and the underlying modules that perform the operations activated and controlled by those user interface items. UI items include buttons, sliders, check boxes, radio buttons, pull-down menus and other graphical controls in a graphical user interface. UI items also include hotkeys and keystrokes on a keyboard that activate and control operations of the program. Indicator items of some embodiments include cursors that change shape, size color, or orientation to indicate that a tool is active, that an object over which the cursor is hovering is a viable selection for operations of the tool and/or that a particular mode of the tool is active. The underlying operations include the actions that the computer or other electronic device (e.g., an iPhone® or an iPod®) on which the GUI is operating performs in response to the user's activation of various UI items. The UI items that activate audio adjustment tools are sometimes referred to herein as audio adjustment tool UI items. In some embodiments, multiple tools use the same modules. Some embodiments use a single audio adjustment tool for lifting and stamping (e.g., a single tool that has a lifting mode and a stamping mode). In other embodiments, the operations described herein for the audio adjustment tool are performed by a lifting tool and a separate stamping tool. That is, in some embodiments, lifting data from a sample clip is performed by a lifting tool and stamping a target clip is performed by a stamping tool. Furthermore, some features described herein as performed by a stamping tool are performed by an audio adjustment tool that performs both in a lifting mode and a stamping mode.

As used herein, the term "maximum volume of a clip" refers to the maximum amplitude or power of the clip, while the term "volume" refers to the overall sound level of the clip. For example, in some embodiments, if a first clip records a sound that is actually twice as loud as a sound recorded on a second clip, then when the two clips have the same volume the maximum volume of the first clip is twice the maximum volume of the second clip.

When two clips are recorded for the same event with the same volumes, upon playback of the clips, the sounds of each clip will be perceived by a listener (e.g., perceived by human ears) as being equally loud. When two clips are recorded for the same event with different volume levels (e.g., because of microphone placement or settings of the devices recording the sounds), upon playback of the clips the sound will be perceived by a listener as not being equally loud on each clip. Therefore, a listener will perceive a difference in the volume of the second clip as compared to the volume of the first clip. Similarly, if clips of similar types of sounds are recorded at different volumes, a listener will perceive the clips as having different volume levels. Therefore, some embodiments try to adjust the volume of the second clip to match the volume of the first clip to reduce the chance that the listener of the first and second clips will perceive a difference in the overall volume level of the first and second clips.

Some embodiments accomplish this by focusing on some particular type of sound on the clip. Some embodiments determine the maximum particular volume of two clips. That is, the maximum volume of a particular type of sound (e.g., the highest amplitude or maximum power of that sound), which in some examples given above and below is the human voice. Other embodiments might focus on other types of sound or on more than one type of sound, or might use other techniques to adjust the volume level of the second clip in order to match it with the first clip and thereby reduce the chance that the user would perceive a difference between the recordings of the two clips. Sounds other than the particular type of sound may be present on the clip, accordingly, in some embodiments, adjusting the volume of the second clip to match the volume of the first clip may result in the maximum volume of the second clip not matching the maximum volume of the first clip. In several embodiments described above and below, the particular sound is the sound of a human voice and the maximum particular volume is a maximum voice volume.

For some embodiments of the invention, FIG. 1 illustrates a graphical user interface ("GUI") 100 of a media editing application with an automated volume adjustment feature. Specifically, this figure illustrates the GUI 100 at four different stages: (1) a first stage 101 that is before the activation of the audio adjustment tool; (2) a second stage 102 that is after the activation of the audio adjustment tool, but before the selection of a sample audio clip; (3) a third stage 103 that is after the selection of a sample clip and the lifting of the voice volume level data from the sample clip; and (4) a fourth stage 104 that is after the selection and stamping of a target clip.

As shown in FIG. 1, the GUI 100 includes a UI item 110 for activation of an audio adjustment tool, a clip timeline display area 120, a sound palette display area 140, and a preset list display area 150. The UI item 110 is the UI item that the user selects to activate the audio adjustment tool that performs the automated volume level adjustment for a target clip. In FIG. 1, the audio adjustment tool is a single tool that a user uses for performing both the lifting and stamping operations (i.e., for the identification of both the sample and target clips). Other embodiments, however, use separate tools for performing the lifting and stamping operations.

The clip timeline display area 120 includes multiple tracks that span along a timeline. This area further provides a graphical representation of the video and audio clips that the media editing application is editing. In this example, two video clips are shown along one track, while three audio clips are shown along audio track 130. Also, the three audio clips have thumbnail waveform representations on them to provide an indication of their audio content. In some embodiments, the audio and video clips can be added to the timeline, removed from the timeline, or moved to different times on the timeline.

The sound palette display area 140 is for displaying options for activated tools. That is, if an activated tool has options (other than activation and selection of clips) associated with that particular tool, the additional options are displayed in the sound palette display area 140 after the tool is activated. The sound palette display area 140 also displays the name or names of clips that have been selected as an object for an activated tool. For example, in stages 103 and 104 of FIG. 1, the name displayed in sound palette display area 140 is identifier 170 of the sample clip that has been selected as an object of the audio adjustment tool. The sound palette display area 140 includes a save-preset tool UI item 145.

The save-preset tool that is activated by UI item 145 is a tool that the user selects to direct the media editing application to store data lifted from a sample clip. The preset list 150 is a menu of previously stored data lifted from sample clips. In some embodiments, the user selects presets from the preset list 150 in order to direct the media editing application to use the saved data for stamping target clips. The preset list display area 150 and the save-preset tool are described in relation to FIG. 2, below.

The operation of the GUI 100 will now be described by reference to the state of the GUI 100 during the four stages 101-104. Stage 101 shows the interface described above. The interface includes three audio clips in display row 130. In some embodiments, the audio clips are selected either from a library of audio clips or by some other process.

In stage 102, a user has activated the audio adjustment tool. This activation is indicated by the inverted colors of the background and text of the audio adjustment tool UI item 110. In some embodiments, the GUI changes the colors of the audio adjustment tool UI item 110 in other ways to indicate that it is active. The activation of the audio adjustment tool is also indicated by the changing of the shape of cursor 157 from a standard cursor arrow to an upward pointing arrow that visually confirms that the audio adjustment tool is prepared to receive the selection of a sample clip in order to lift the voice level from the sample clip. Other embodiments, however, indicate the selection of the audio adjustment tool differently. For instance, in some embodiments, the cursor takes the shape of an upward arrow only when the cursor is over a clip that can be selected (a potential sample clip). In other embodiments, the cursor takes the shape of an upward pointing arrow when it is on the audio track 130, or when it is anywhere in clip timeline display area 120.

Stage 103, shows the GUI after the selection of a sample clip and the lifting of the voice volume level data from the sample clip 160. The selection of the sample audio clip 160 causes the media editing application to perform an automated process that determines whether the sample clip contains voice content, and if so, identifies the maximum level of the voice content. One way for performing this determination and identification is further described in section III.B, below.

After the sample clip 160 is selected in stage 103, the GUI displays an identifier 170 of the sample audio clip 160 in sound palette display area 140. The cursor 165 also changes to a downward arrow to indicate that the GUI 100 is ready to receive selections of target clips in order to stamp the selected target clips.

In stage 104, the user uses the cursor 165 to select the target audio clip 180 for a stamping operation. Specifically, this selection causes the media editing application to determine whether the target audio clip has voice content. If so, the media editing application (1) determines the maximum voice level of a target media clip, (2) computes an adjustment factor based on the identified maximum voice levels of the sample and target media clips, and (3) adjusts the volume of the target clip based on the computed adjustment factor.

In the example illustrated in FIG. 1, the sample and target audio clips have voice data. Accordingly, in this example, the stamping operation in stage 104 uses the previously determined voice volume level of the sample clip 160 and the voice volume level of the target clip, to adjust the volume of the target clip 180 in proportion to the relative voice volume levels of the two clips. The GUI then displays a modified waveform for target clip 180 that illustrates the new volume of the target clip 180.

Figure 2:
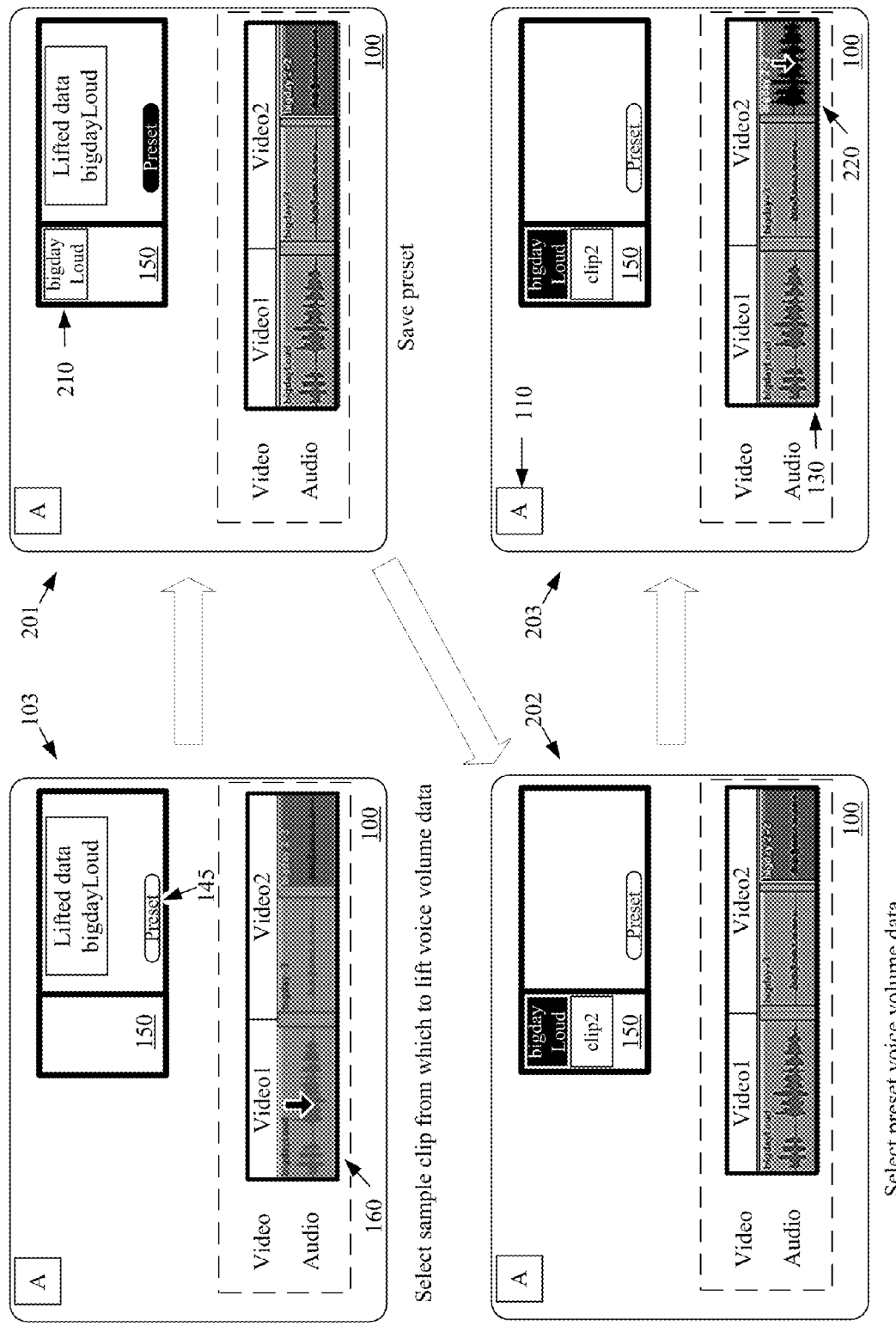
FIG. 2 illustrates GUI controls of some embodiments for storing, retrieving, and applying voice volume levels.

FIG. 2 illustrates GUI controls of some embodiments for storing, retrieving, and applying voice volume levels. Specifically, FIG. 2 illustrates controls of a GUI 100 for saving voice volume data lifted from a sample audio clips and selecting a saved voice volume level to apply to a target audio clip from a list 150 of presets. Specifically, the figure illustrates four stages: (1) stage 103 that is after the selection of a sample clip and the lifting of the volume level data from the sample clip, is the same as stage 103 in FIG. 1; (2) stage 201 that is after lifted data has been saved as a preset; (3) stage 202 that is after the selection of a preset; and (4) stage 203 that is after the stamping of a target clip.

As shown in FIG. 2, the GUI 100 includes list 150 of preset voice volume values, and save-preset tool UI item 145. The save-preset tool saves the lifted data of selected sample clips. In some embodiments, the process for selecting such a clip is similar to the process of selecting a clip illustrated in FIG. 1. In some embodiments, a save-preset tool is used without lifting data before using the save-preset tool. In some such embodiments, a UI item is used to activate a preset operation and then a sample clip is selected. List 150 includes preset voice volume levels that have been stored for later selection. In some embodiments, the presets are stored so that data previously lifted from a sample clip can be applied to target clips without lifting the data from the sample clip every time a user wants to apply the voice volume level of a sample clip to a new target clip.

Stage 103 shows that data has been lifted from sample clip 160. In stage 201, the save-preset tool UI item 145 is selected which activates the save-preset tool which saves the value (or values) associated with the voice volume level of the presently selected sample clip, sample clip 160. The media editing program stores the saved data and provides the user with an option to access that saved data. In some embodiments, the option is presented as a selectable (e.g., via a click-to-select operation) preset 210 placed on a list 150 of preset values. In some embodiments, the option displays the name of the sample clip. Sample clip 160 and preset 210 each contains the word "bigdayLoud".

FIG. 2 shows stage 202 as immediately following stage 201. However, in some embodiments, a preset can be selected any time after it has been saved, not just immediately after it has been saved. In stage 202, preset 210 is selected from the list 150 of presets. In some embodiments, selecting a preset automatically causes the GUI to prepare to receive a selection of a target audio clip. In other embodiments, a UI item activates the preset list which can then be accessed. In stage 203, the new target clip 220 is selected in a similar manner to the selection of the target clip in stage 104 of FIG. 1.

I. Process for Audio Adjustment

Figure 3:
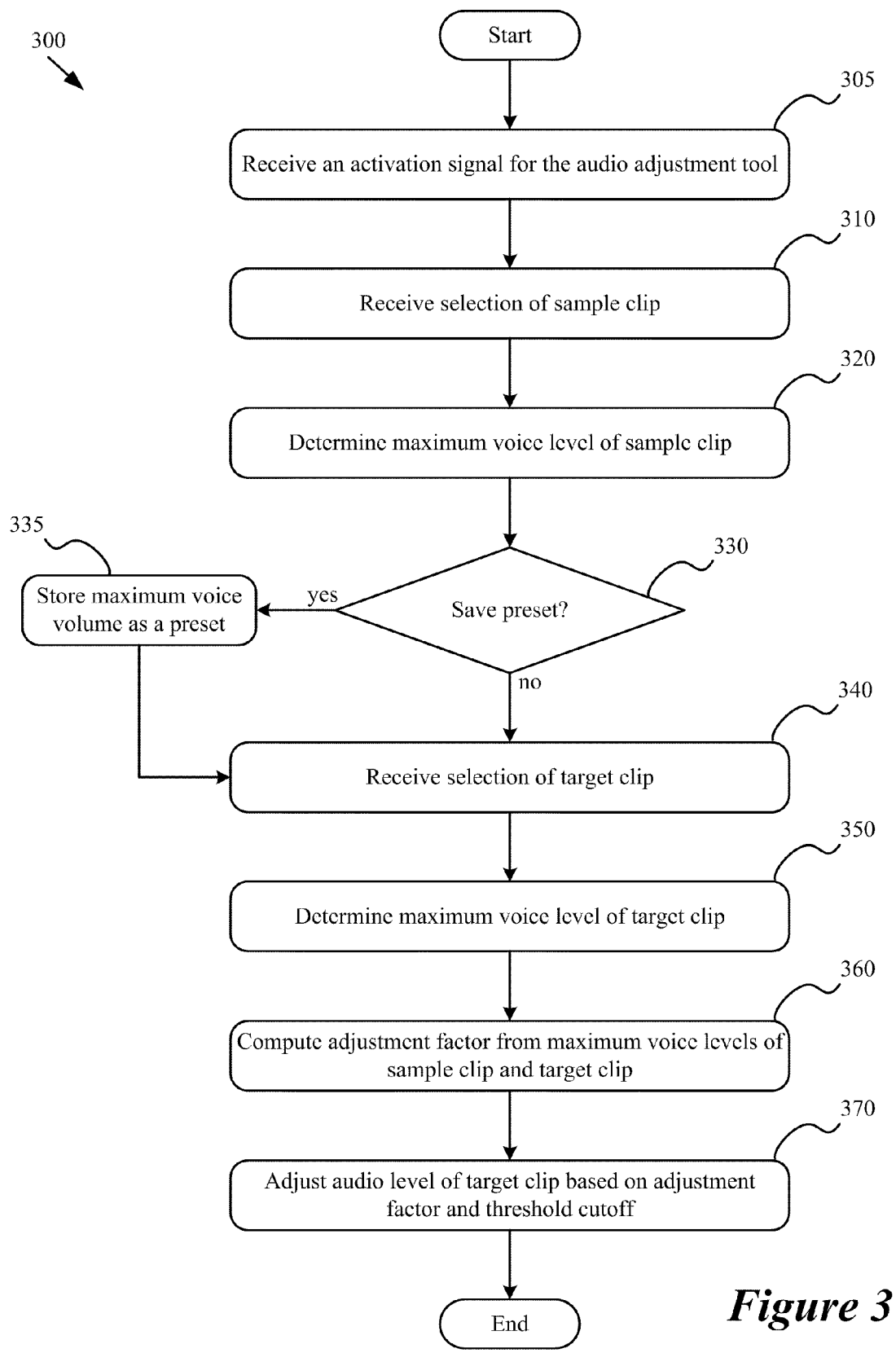
FIG. 3 conceptually illustrates a process of some embodiments for adjusting the audio of a target clip.

FIG. 3 conceptually illustrates a process 300 of some embodiments for adjusting the audio of a target clip so that the volume of the voice or voices on the target clip matches the volume of the voice or voices on the sample clip. The process will be described by reference to FIGS. 4-10 which illustrate the GUI 400 of an audio editor of some embodiments that use process 300. Because the process is described in relation to GUI 400, some components of the GUI 400 are described in section I.A. in order to prepare for the explanation of process 300 in section I.B, below.

A. Graphical User Interface

Figure 4:
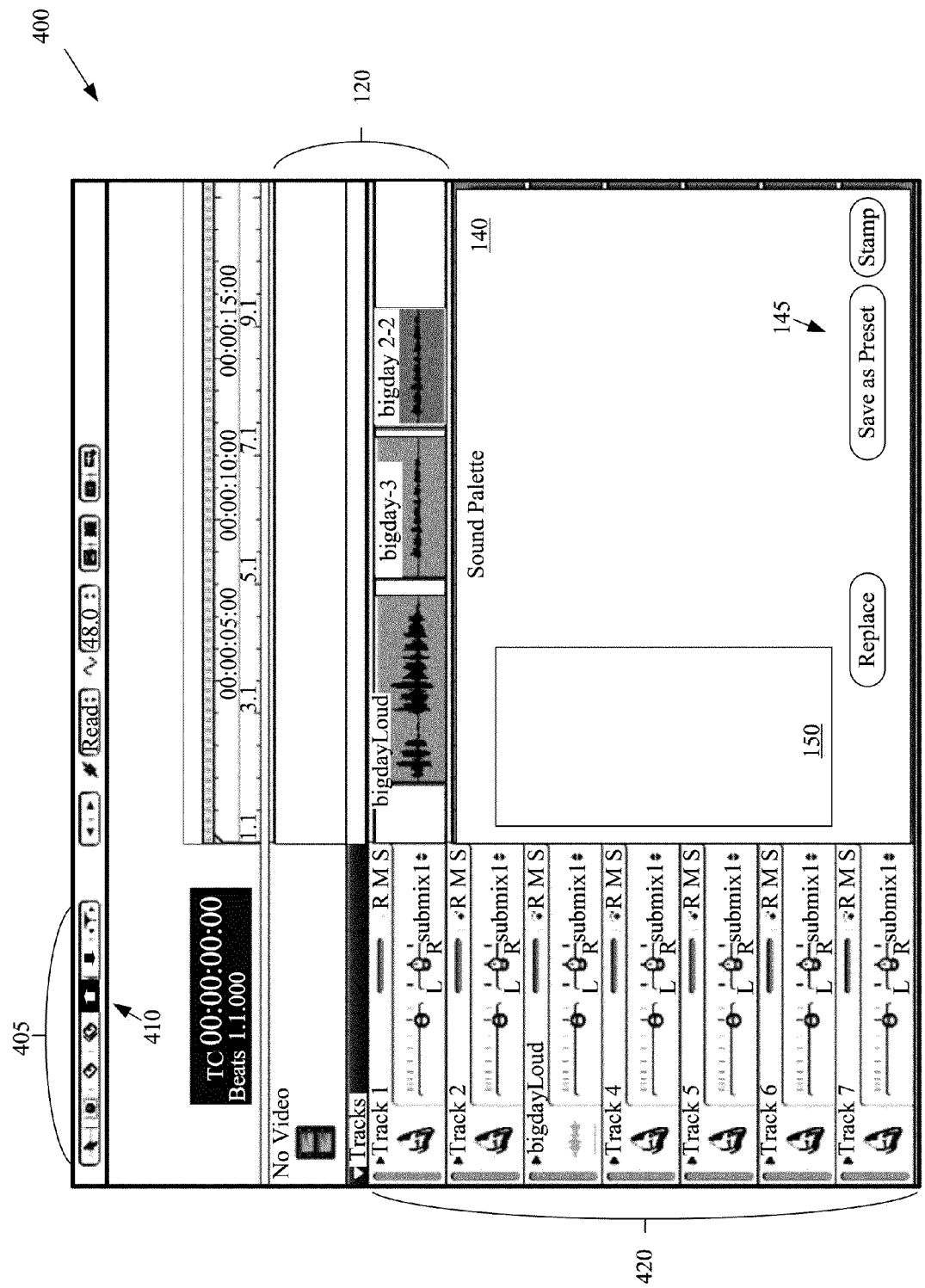
FIG. 4 illustrates a graphical user interface (GUI).
Figure 5:
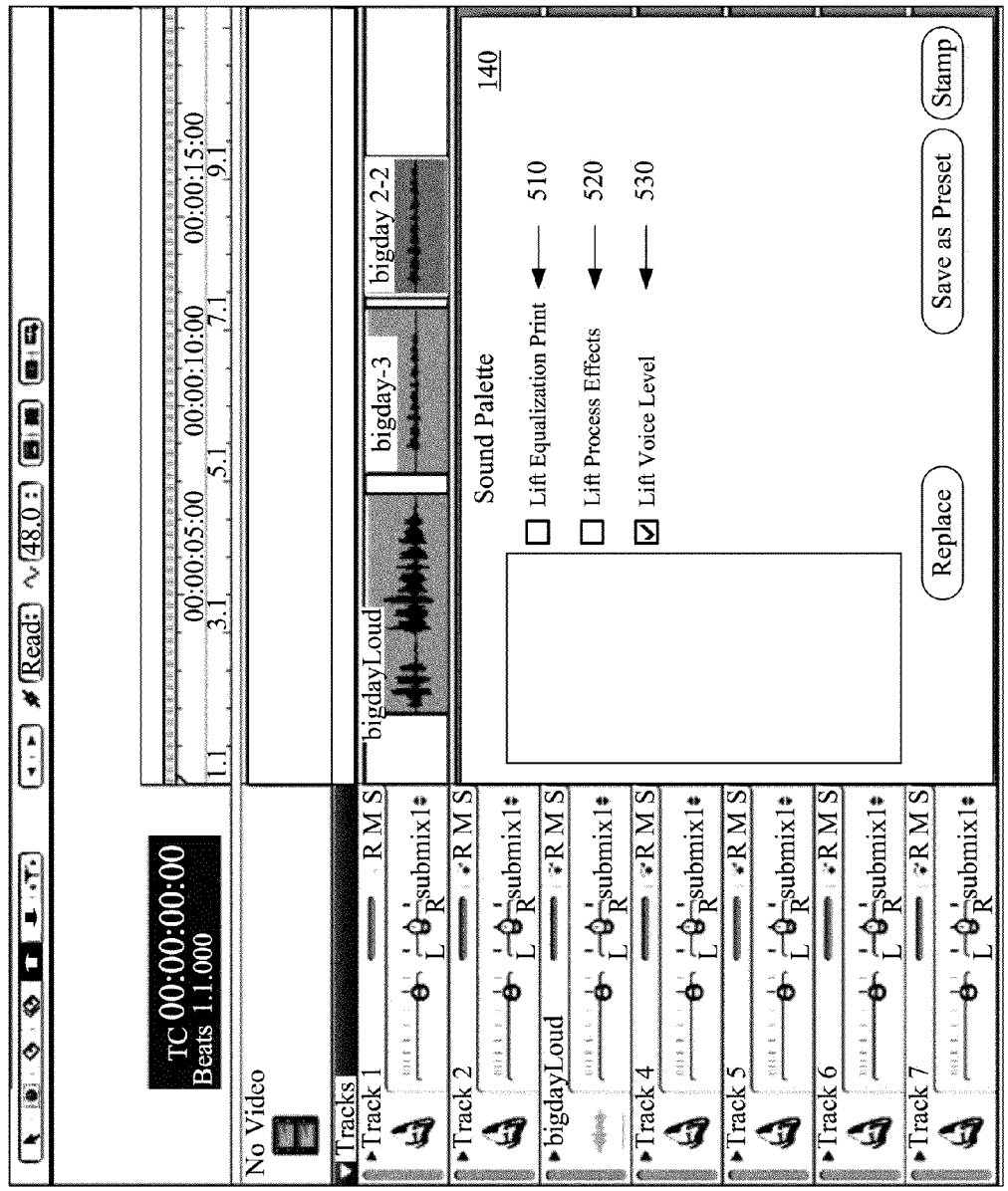
FIG. 5 illustrates a GUI with secondary controls in a sound palette.

Like the GUI illustrated in FIG. 1, the GUI of FIGS. 4-10 allows a user to select a sample clip and adjust a target clip so that the maximum voice volume level of the target clip matches the maximum voice volume level of the sample clip. Specifically, FIGS. 4 and 5 show the controls used in some embodiments to lift data from a sample clip.

FIG. 4 illustrates a GUI 400. FIG. 4 includes bank of controls 405 that include an audio adjustment tool UI item 410, a clip timeline display area 120, with multiple audio clips, a multi-track display 420, a sound palette 140, a preset list 150, and a save-preset tool UI item 145. The preset list 150 and the save-preset tool are further described in relation to FIG. 8 in section I.B, below, and FIGS. 12-13, in section II. FIG. 4 shows that the audio adjustment tool is active (as demonstrated by the black background and white foreground of audio adjustment tool UI item 410).

In some embodiments, once the audio adjustment tool is activated, the GUI prepares to receive a selection of a sample clip. In some embodiments the audio adjustment tool UI item 410 continues to show that the audio adjustment tool is active (e.g., by inverted colors of UI item 410 when the audio adjustment tool is active) until a sample clip is selected. The multi-track system 420 is for manually adjusting the volume of various audio tracks of the clips.

FIG. 5 illustrates the GUI 400 with secondary controls in the sound palette 140. FIG. 5 includes sound palette 140, and secondary controls 510, 520, and 530. As described in relation to FIG. 1, in some embodiments, the sound palette 140 provides secondary controls that appear when a tool is activated. In this figure, the secondary controls 510-530 include options to determine any or all of three different types of data from the sample to be selected. Specifically, secondary control 510 determines whether an equalization print will be taken from the sample clip, secondary control 520 determines whether process effects will be taken from the sample clip, and secondary control 530 determines whether the voice level will be taken from the sample clip. In the embodiments illustrated here, the GUI 400 is set to take the voice level from the sample clip, but not to take an equalization print or process effects from the sample clip.

B. Lifting and Stamping

The process 300 starts when the media editing application receives (at 305) an activation of the audio adjustment tool (e.g., by a selection of UI item 410), as shown in FIG. 4. In some embodiments the GUI provides secondary UI items for specifying that the maximum voice volume level is an attribute that should be lifted from the sample clip, as shown in FIG. 5. Other embodiments simply include the voice level as an attribute to be lifted when the audio adjustment tool is used. Such embodiments do not require that the voice level be specifically selected.

Figure 6:
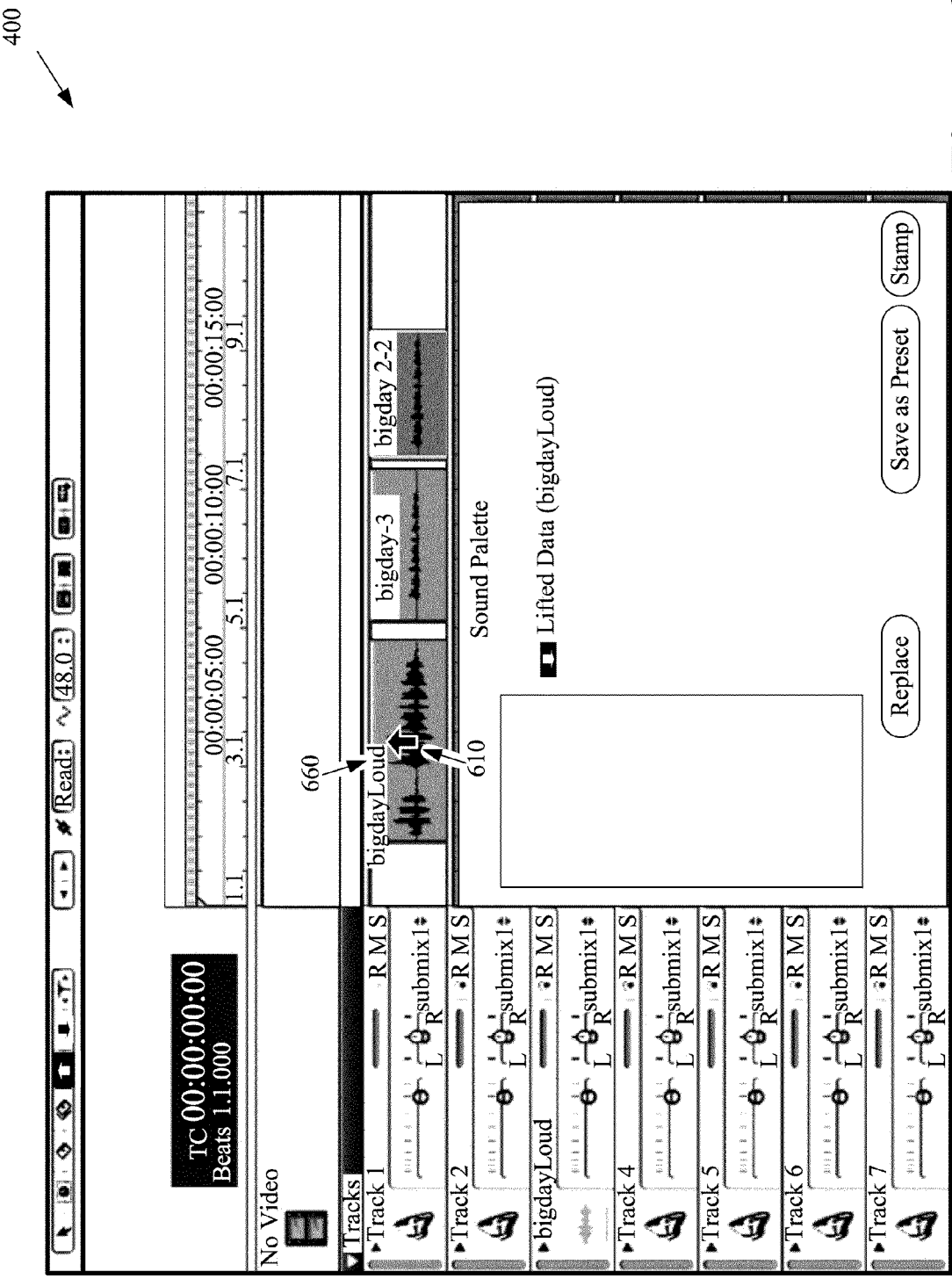
FIG. 6 illustrates a GUI of some embodiments shortly before the selection of a sample clip.
Figure 7:
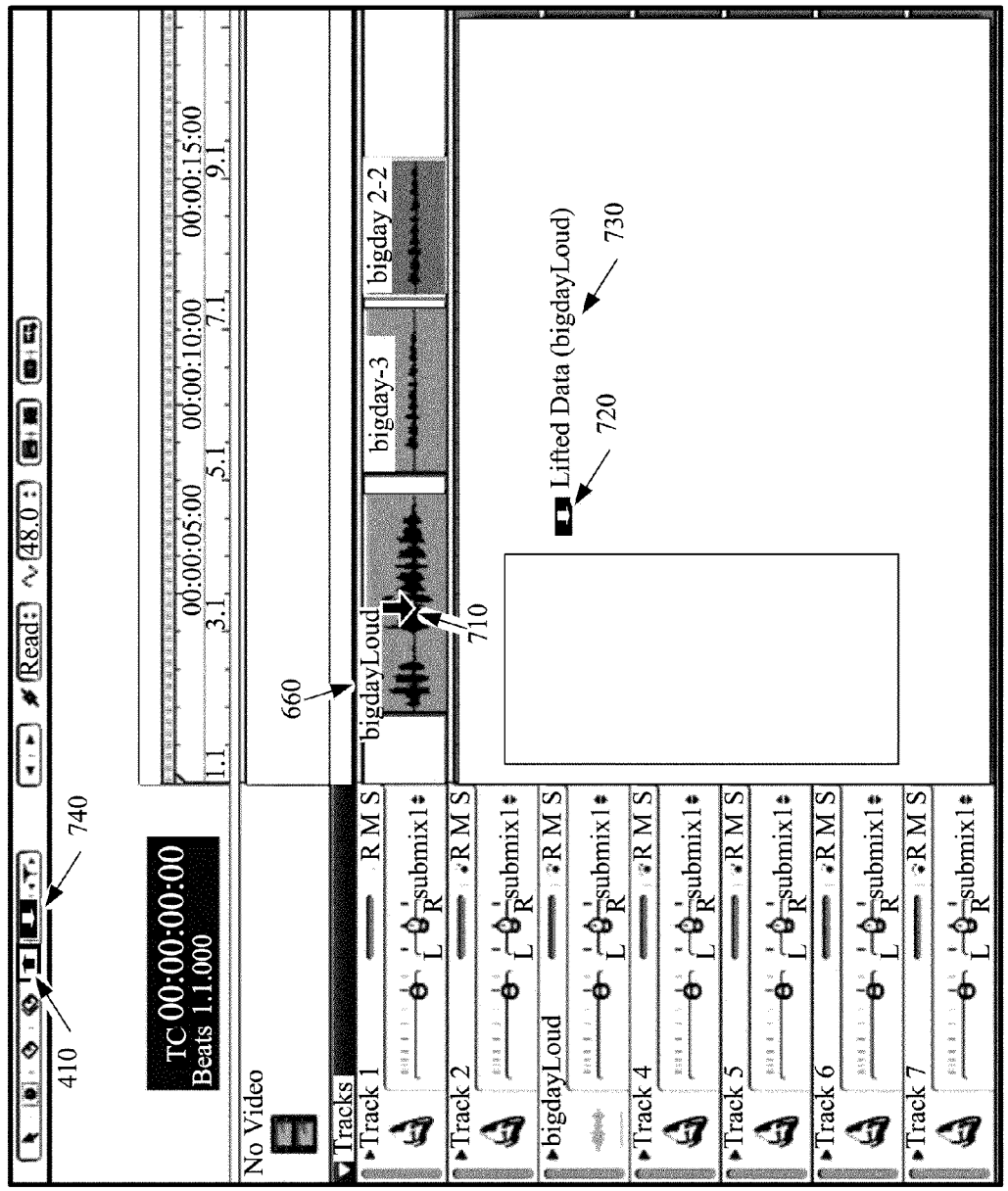
FIG. 7 illustrates a GUI after it has received the selection of a sample audio clip.

The process 300 then receives (at 310) a selection of an audio clip to use as a sample. FIG. 6 illustrates GUI 400 of some embodiments shortly before the selection of a sample clip. FIG. 6 shows cursor 610 hovering over audio clip 660. The cursor 610 of this embodiment has changed shape into an upward arrow to show that the GUI is waiting for a sample clip to be selected. FIG. 7 illustrates GUI 400 after it has received the selection of the sample audio clip 660. FIG. 7 includes cursor 710, active tool indicator 720, sampled clip identifier 730, and audio stamping tool UI item 740. The cursor 710 has changed into a downward arrow to show that the GUI is prepared to receive a selection of a clip to be stamped. The active tool indicator 720 indicates that the currently active tool is the stamping tool. The sampled clip identifier 730 identifies which clip will be used as the sample for the clip or clips that will be selected for stamping. Different embodiments provide different controls for commanding the GUI to prepare to receive a selection of a target clip. In some embodiments, clicking on the sample clip 660 while the audio adjustment tool is ready to receive a selection of a sample clip automatically activates the stamping operation (either as a separate stamping tool or as a stamping mode of an audio adjustment tool) so that the next clip selected will be treated as the target clip without any intervening controls required. In some such embodiments audio stamping tool UI item 740 acts as an indicator that the GUI has switched from being ready to accept a sample to being ready to accept a target (here, by inverting the colors of audio stamping tool UI item 740). The audio adjustment tool UI item 410 no longer has inverted colors, thus demonstrating that lifting is no longer active. Instead, audio stamping tool UI item 740 is shown in inverted colors, indicating that the audio adjusting tool is now ready to stamp audio clips.

The process then analyses the selected clip to determine (at 320) the maximum volume of the voice or voices on the selected clip. The analysis of the maximum volume of the voice or voices on the selected clip is further described in section III.B, below. In some embodiments, the data derived from the analysis of the selected sample clip can be saved (at 330) as a preset, in which case it is stored (at 335) for access at later times.

Figure 8:
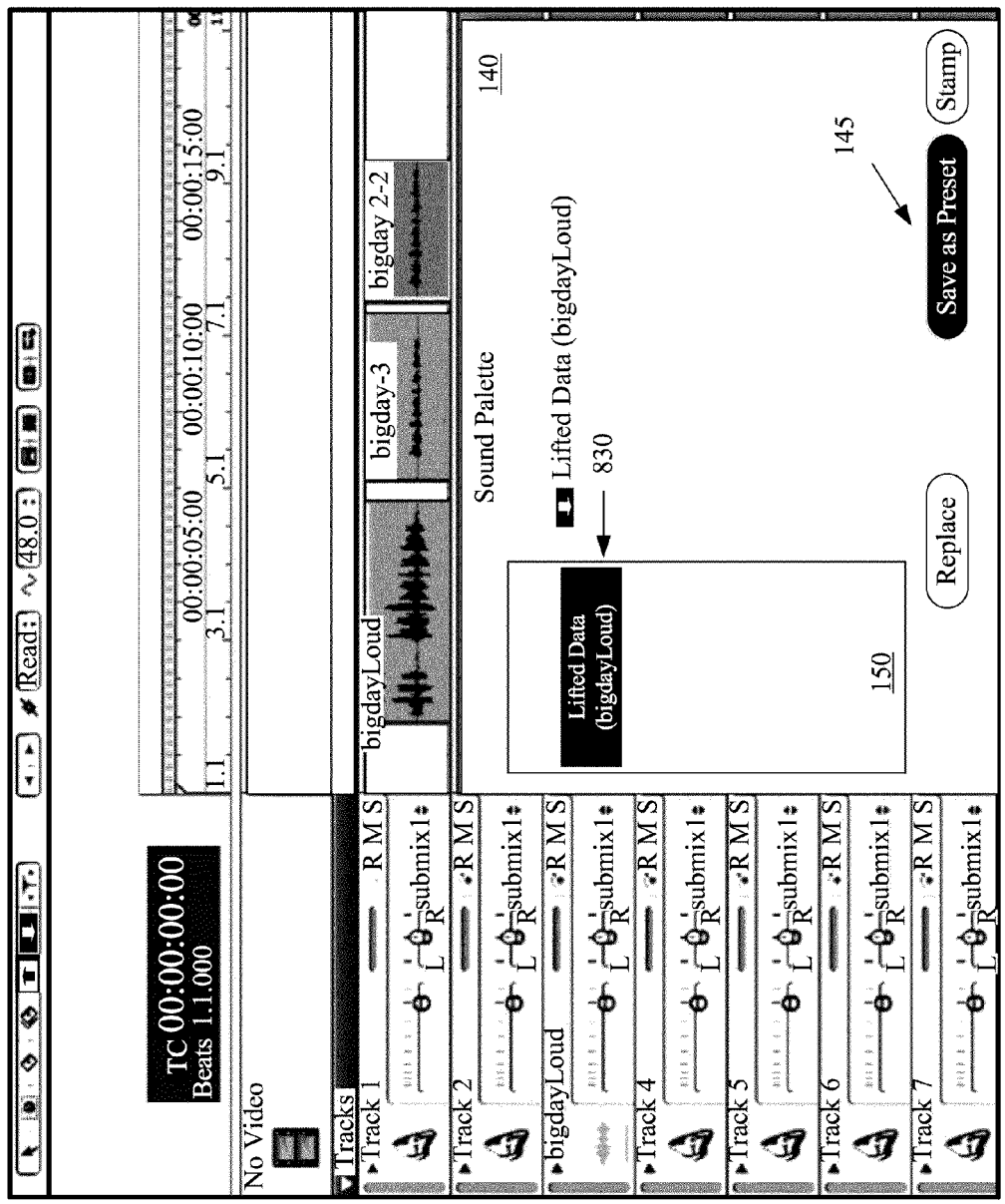
FIG. 8 illustrates saving a preset.

FIG. 8 illustrates saving a preset. FIG. 8 includes a sound palette 140, a save-preset tool UI item 145, and a preset list 150 that shows saved preset 830. In some embodiments, the save-preset tool (after being activated by, e.g., a click on save-preset tool UI item 145) takes whatever lifted data would be used to adjust a target clip to match a sample clip and copies it to storage for later use. Some such embodiments provide access to the stored data in the form of a list 150 of available presets. In some embodiments, the preset list 150 labels the presets with the name of the sample clip from which the preset was derived. Saving the data derived from the sample clip as a preset is shown in FIG. 3 as occurring directly after the sample is selected. However, one of ordinary skill in the art will realize that in some embodiments, the preset can be saved at different times. In some embodiments, a preset can be saved even after a sample clip's data has been used to stamp one or more target clips. In some embodiments a preset can be saved at any time between when a sample clip is selected and when a replacement sample clip is selected (e.g., after reactivation of the audio adjustment tool). The process of retrieving such presets is further described in section II, below.

Figure 9:
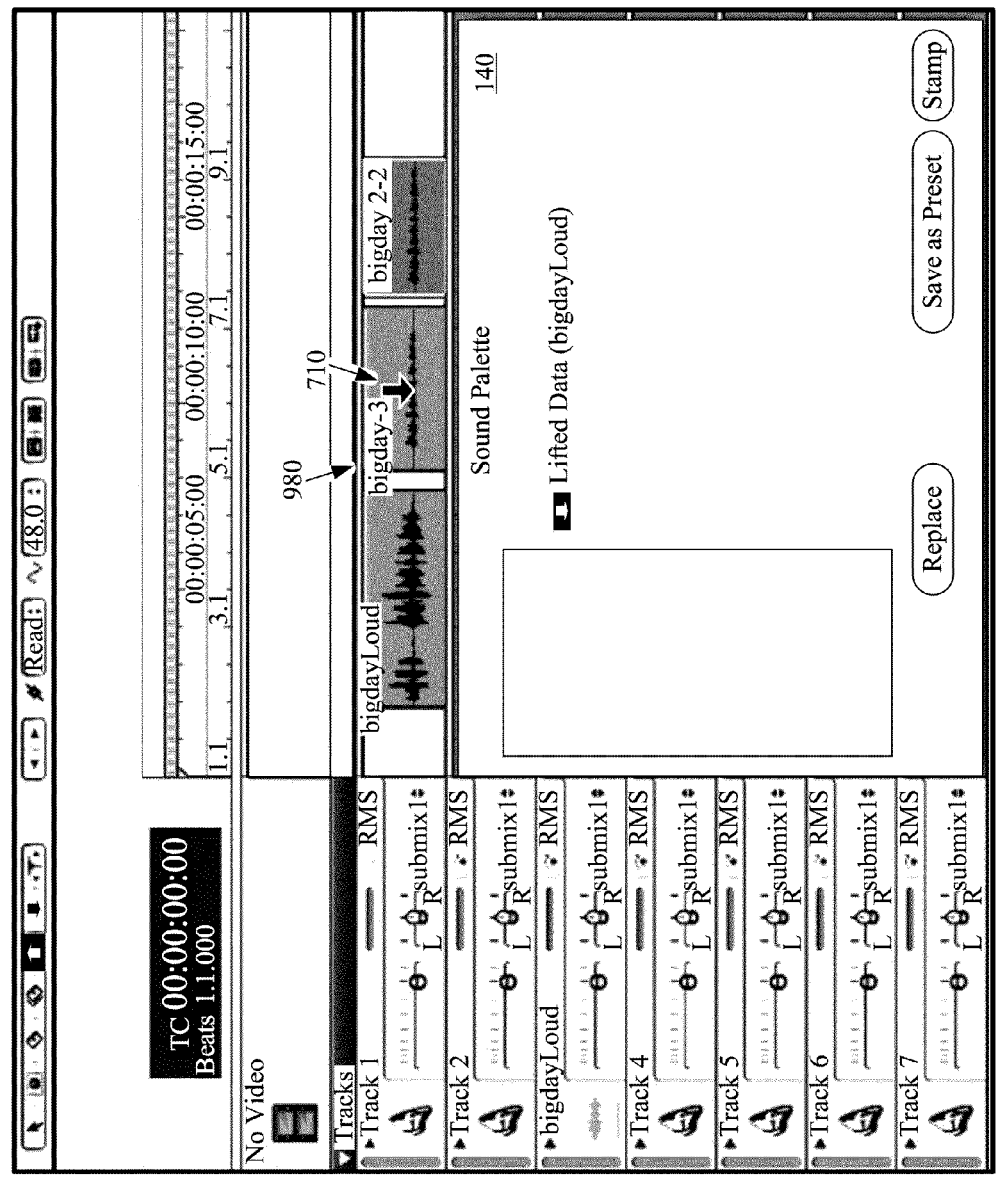
FIG. 9 illustrates the selection of a target clip.

The process receives (at 340) a selection of a target clip. FIG. 9 illustrates the selection of a target clip 980. FIG. 9 shows the GUI just before the target clip is selected. FIG. 9 includes Cursor 710, and audio clip 980. Cursor 710 still has the shape of a downward arrow, indicating that the audio adjustment tool is ready to stamp whatever clip is selected. Cursor 710 is hovering over audio clip 980.

Figure 10:
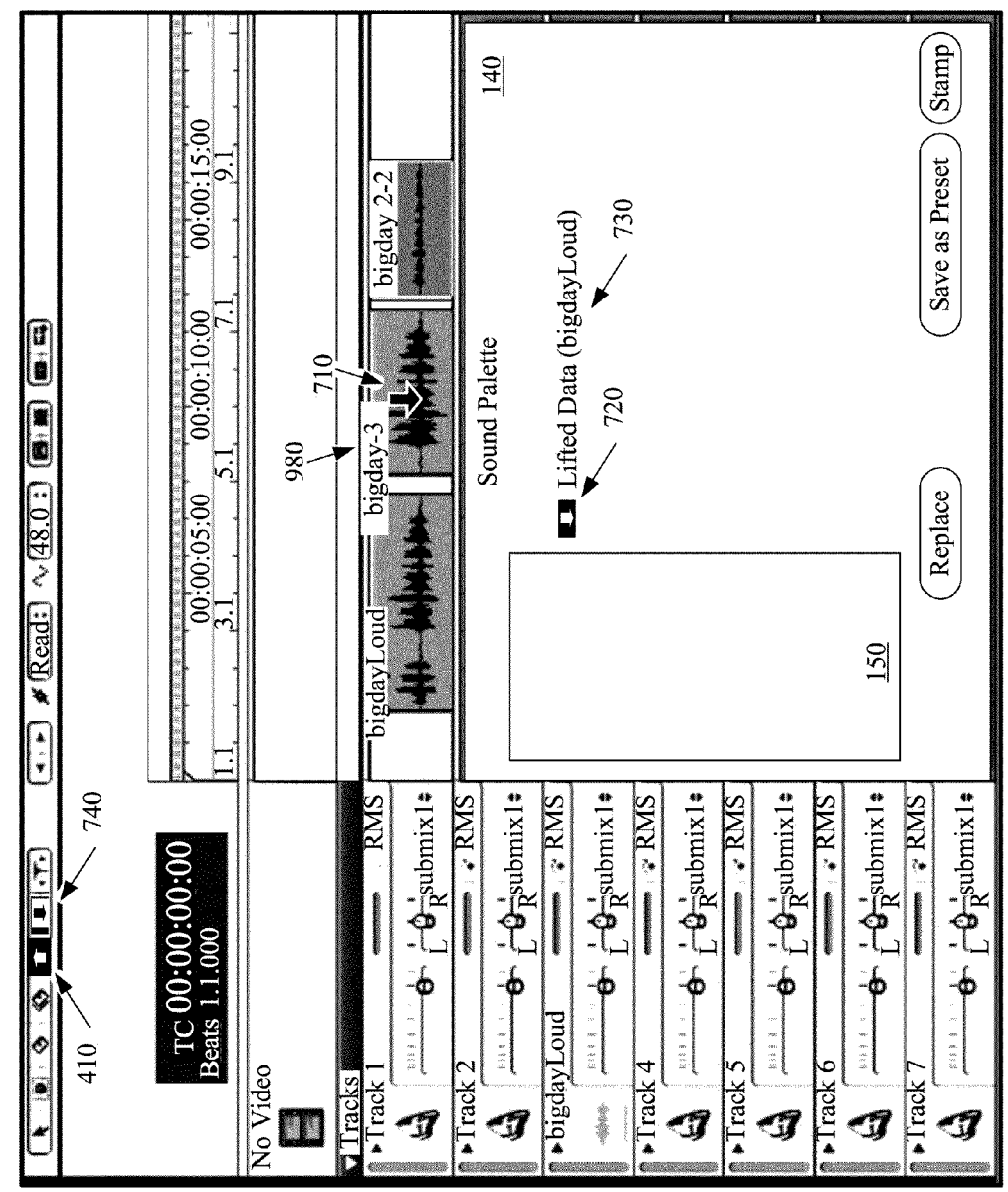
FIG. 10 illustrates a GUI with a stamped target audio clip.

The process analyzes the target clip to determine (at 350) what the maximum volume is of the voice or voices on the clip. The process computes (at 360) a volume adjustment factor that will raise the maximum voice volume level of the target clip to a maximum voice volume level equal to or comparable to the maximum voice volume level of the sample clip. The process adjusts (at 370) the audio level of the target clip based on the adjustment factor. FIG. 10 illustrates GUI 400 with a stamped target audio clip after the process has adjusted the audio level of the clip. FIG. 10 includes stamped audio clip 980, cursor 710, active tool indicator 720, and sampled clip identifier 730. Audio clip 980 now has a larger waveform than it did in FIG. 9. This indicates that the volume of the clip has increased. In some embodiments the adjustment takes into account a cutoff threshold for the volume of the audio clip. The adjustment of the target clip is further described in section III.C, below.

When many clips need to be adjusted, a user may want to sample one clip, and then set several target clips to the voice volume of the same sampled clip. Accordingly, in some embodiments, after a target clip has been stamped, the GUI remains ready to stamp further clips. In some embodiments, the stamping tool (or stamping mode of a unitary audio adjustment tool) remains active until the user chooses to turn off stamping tool (e.g., by clicking an audio adjustment tool UI item). A stamping tool remaining active is demonstrated in FIG. 10 by the cursor 710, which still appears as a downward arrow even after clip 980 has been stamped. The readiness of the GUI to stamp further clips is also indicated in FIG. 10 by active tool indicator 720, which still indicates that the stamping tool is active. The sampled clip identifier 730 still identifies the previously selected sample clip as being the sample for the clip or clips that will be selected for stamping. The audio stamping tool UI item 740 also indicates that the GUI is still ready to receive more selections of target clips.

II. Retrieving Preset Maximum Voice Volume Level

Figure 11:
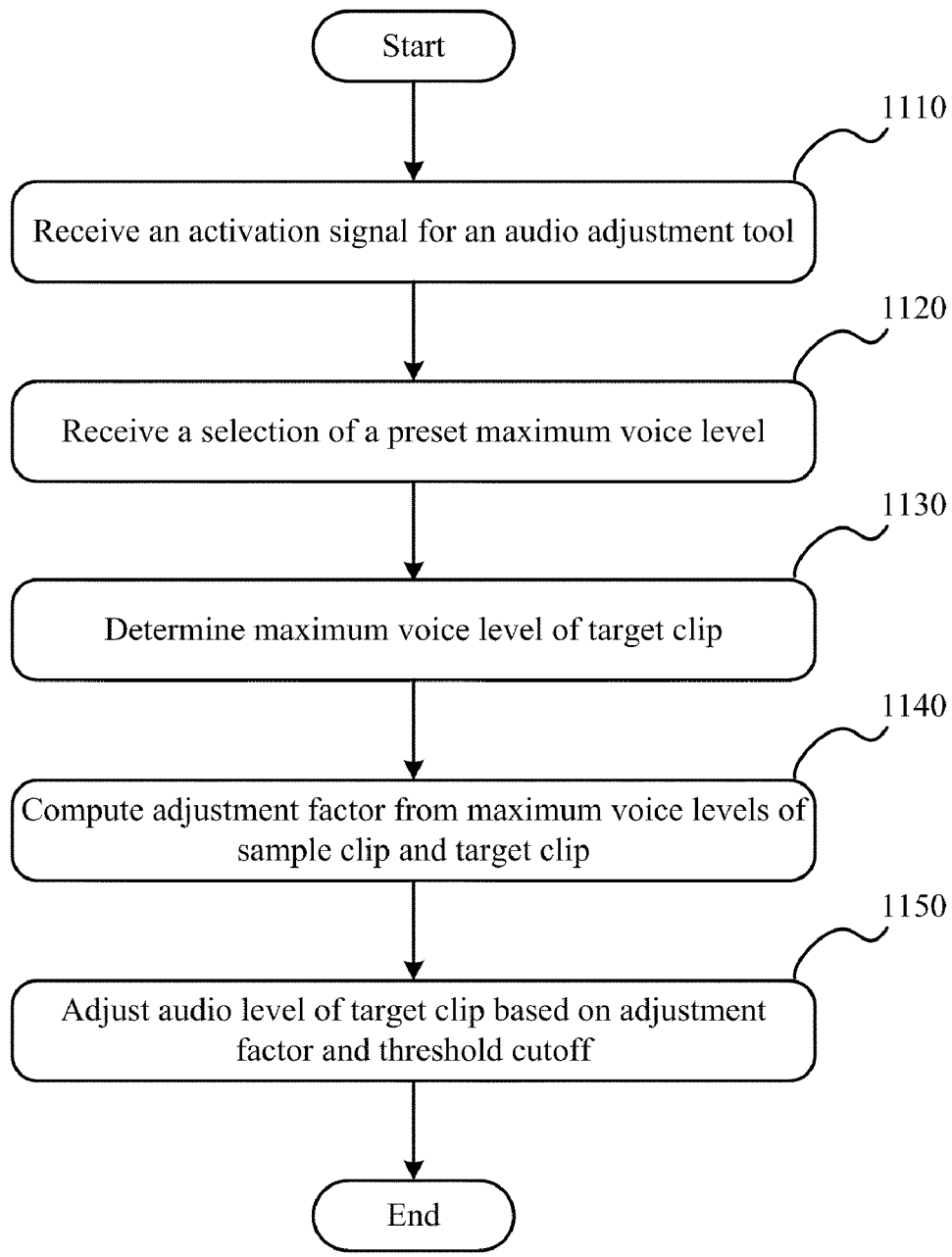
FIG. 11 conceptually illustrates a process of some embodiments for retrieving a preset maximum voice volume level and applying the preset data to a target audio clip.

The GUI of some embodiments includes controls to save and retrieve voice volume levels of sample clips. Controls in GUI 400 for saving voice volume levels are described in relation to FIG. 8 in section I.A, above. FIG. 11 conceptually illustrates a process of some embodiments for retrieving a preset maximum voice volume level and applying the preset data to a target audio clip. The process will be described by reference to FIGS. 12-13 which illustrate GUI controls of some embodiments for retrieving and applying preset voice volume levels.

Figure 12:
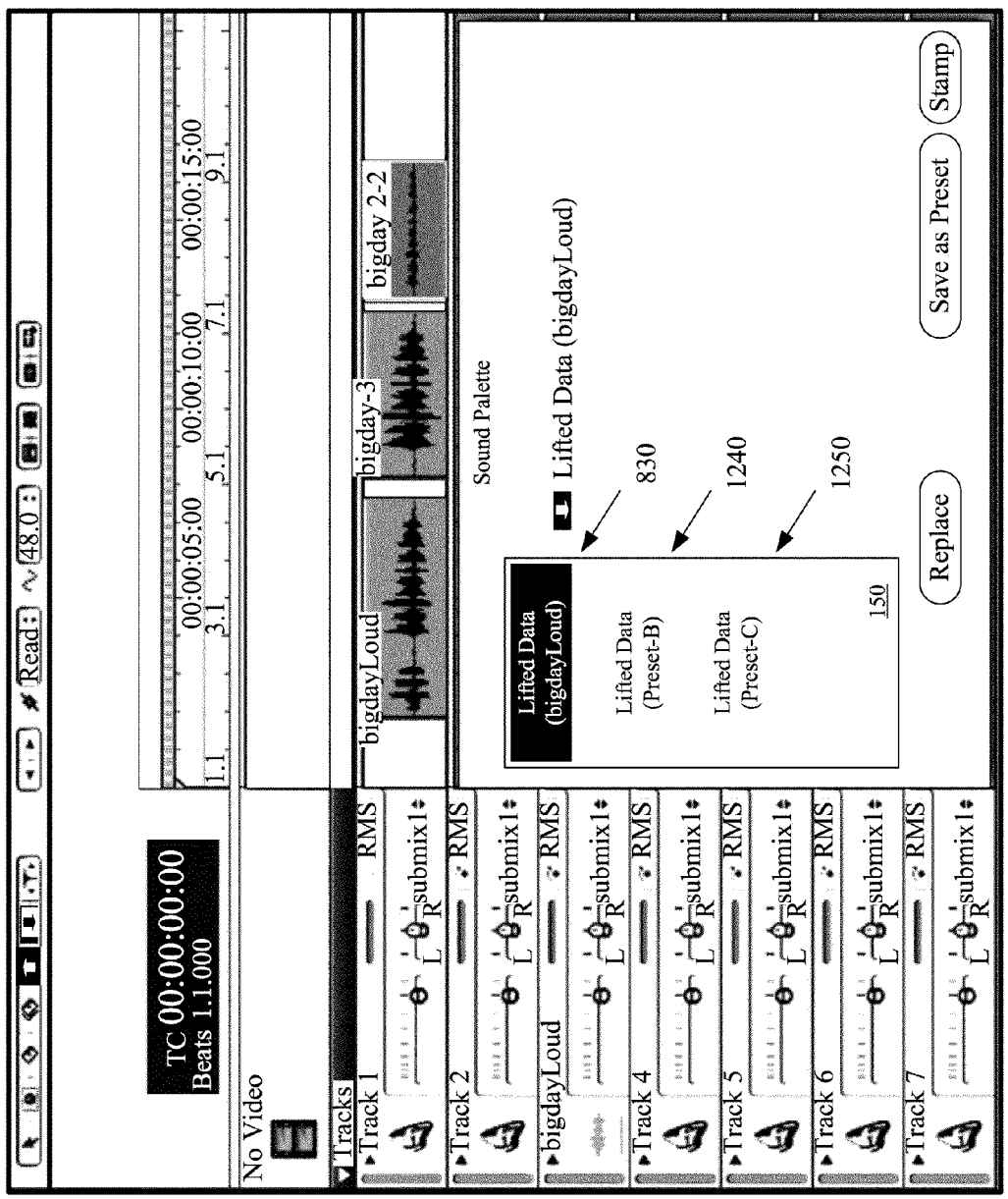
FIG. 12 illustrates the selection of a preset voice volume level.

Process 1100 begins by receiving (at 1110) an activation of the audio adjustment tool. The process then receives (at 1120) a selection of a previously saved preset. The GUI controls for receiving the selection are shown in FIG. 12. FIG. 12 illustrates the selection of a preset voice volume level. FIG. 12 includes presets 830, 1240, and 1250 in preset list 150. In FIG. 12, the preset 830, has been selected, as indicated by the inverted colors of preset 830. Presets 1240 and 1250 are non-selected presets.

Figure 13:
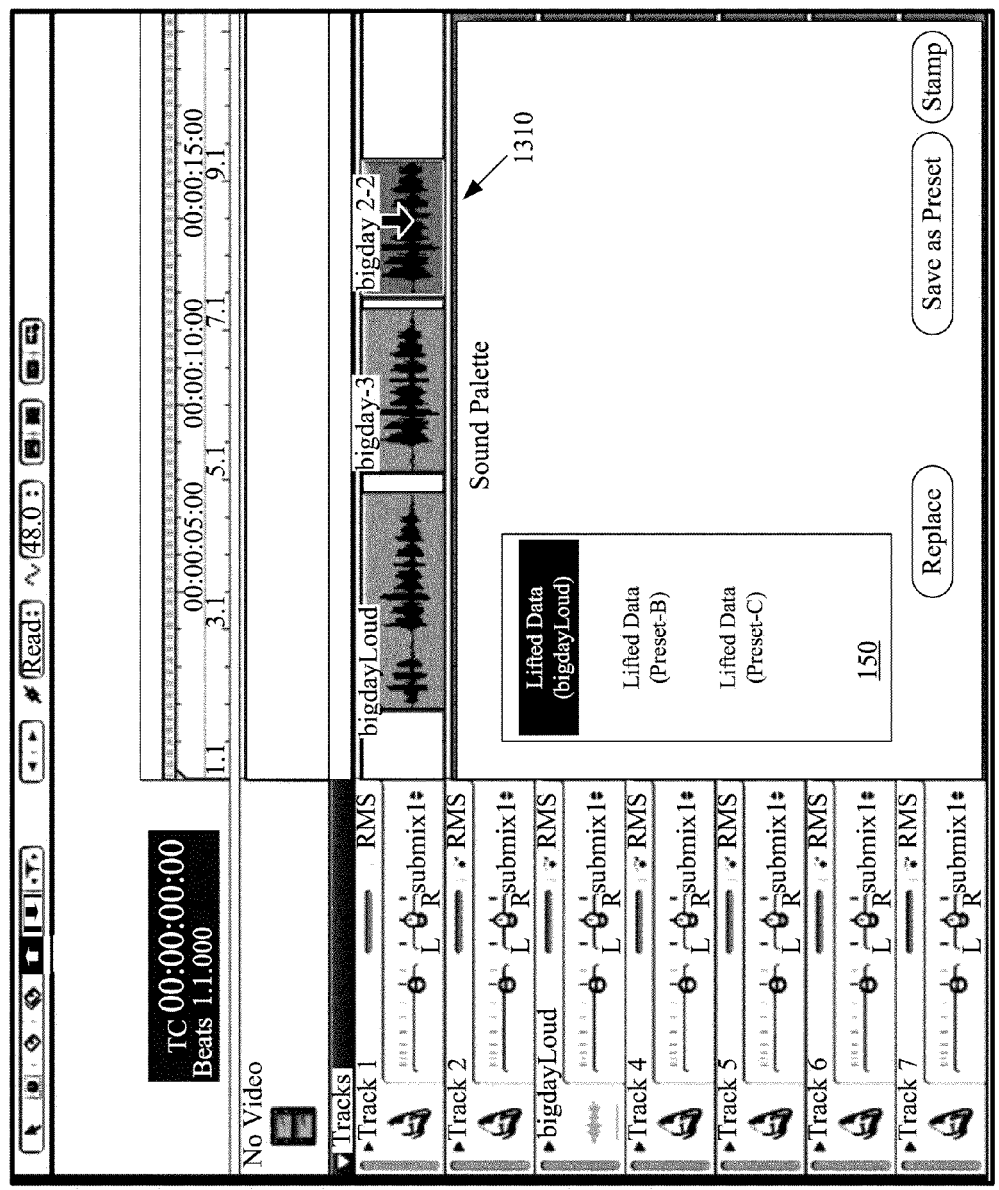
FIG. 13 illustrates the adjustment of audio levels of a target clip.

The process then determines (at 1130) the maximum voice level of the target clip. The process calculates (at 1140) an adjustment factor from the maximum voice levels of the target clip and the sample clip (i.e., the values saved as a preset). The process then adjusts (at 1150) the audio level of the target clip based on an adjustment factor and a threshold cutoff. The GUI implementation of operation 1150 is illustrated in FIG. 13. FIG. 13 illustrates the adjustment of audio levels of a target clip. FIG. 13 includes target clip 1310, which has been adjusted to increase the volume. In some embodiments, the selection of a target clip for a preset voice volume level is the same as the selection shown in FIG. 10 for a target clip for a newly calculated sample clip.

III. Software

A. Block Diagram

Figure 14:
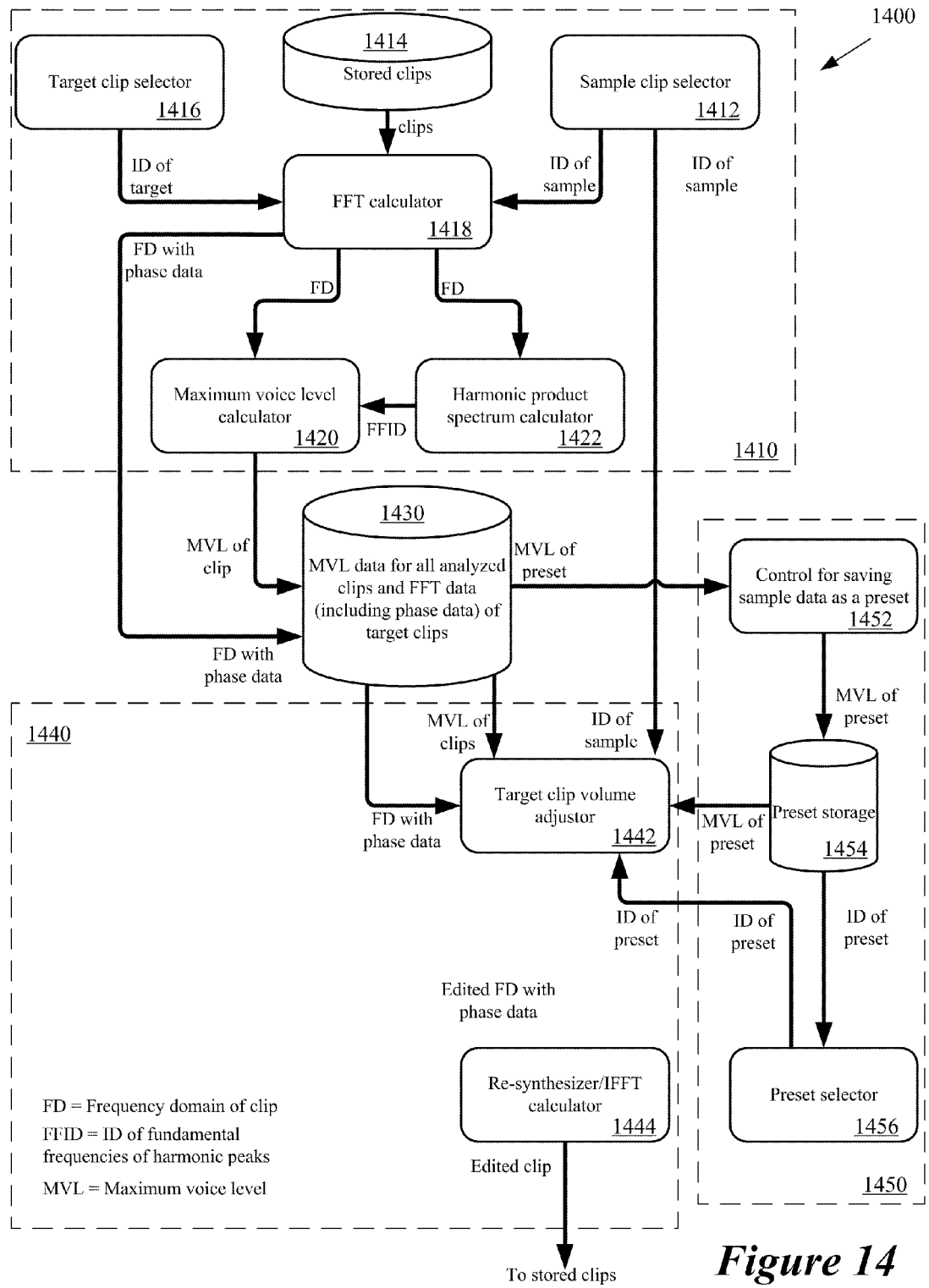
FIG. 14 illustrates a conceptual software block diagram of some embodiments.

In some embodiments, the processes described above are implemented as software running on a particular machine, such as a computer or a handheld device, or stored in a computer readable medium. FIG. 14 conceptually illustrates the software architecture of an application of some embodiments. In some embodiments, the application is a stand-alone application or is integrated into another application (for instance, the application might be a portion of a video-editing or media editing application); while in other embodiments the application might be implemented within an operating system. Furthermore, in some embodiments, the application is provided as part of a server-based (e.g., web-based) solution. In some such embodiments, the application is provided via a thin client. That is, the application runs on a server while a user interacts with the application via a separate client machine remote from the server (e.g., via a browser on the client machine). In other such embodiments, the application is provided via a thick client. That is, the application is distributed from the server to the client machine and runs on the client machine.

FIG. 14 illustrates a conceptual software block diagram 1400 of some embodiments. The software block diagram includes a large number of modules shown here as separated into three main categories 1410, 1440, and 1450 based on the type of operation with which each module is associated. One of ordinary skill in the art will realize that these categories are provided for ease of explanation and that different embodiments categorize modules differently. Category 1410 includes modules that analyze clips to determine the maximum voice volume level of the clips. Category 1440 includes modules that adjust the volume of target clips and save the resulting adjusted target clips. Category 1450 includes modules that store and retrieve preset values of maximum voice volume level. Category 1410, which analyzes clips, includes sample clip selector 1412, clip storage 1414, sample clip selector 1416, fast Fourier transform (FFT) calculator 1418, maximum voice level calculator 1420 and harmonic product calculator 1422. Outputs of maximum voice level data and frequency domain are sent to data storage 1430. Category 1440, which adjusts the volume of target clips, includes target clip volume adjustor 1442 and re-synthesizer/inverse fast Fourier transform (IFFT) calculator 1444. Category 1450 includes a control 1452 for saving presets, a preset storage 1454, and a preset selector 1456.

In some embodiments with separate lifting and stamping tools, the modules that perform analysis of clips are part of both the lifting and stamping tools. In some such embodiments, the modules that adjust the volume are part of the stamping tool. In some embodiments with a single audio adjustment tool for lifting and stamping, the modules for analysis and adjustment are part of the single audio adjustment tool.

1. Analysis of Clips

Category 1410, which includes modules that analyze clips, includes sample clip selector 1412, clip storage 1414, sample clip selector 1416, fast Fourier transform (FFT) calculator 1418, maximum voice level calculator 1420, and harmonic product calculator 1422. Outputs of maximum voice level data and frequency domain are sent to data storage 1430.

The sample clip selector 1412 receives input from a user (not shown) selecting a sample clip. The sample selector passes on the sample clip identification to the FFT calculator 1418 and (in some embodiments) the target clip volume adjustor 1442. Similarly, the target clip selector 1416 receives input from a user selecting a target clip. The target clip selector 1416 then passes the target clip ID on to the FFT calculator 1418 and (in some embodiments, not shown) the target clip volume adjustor 1442.

The audio clips of some embodiments are stored as time domain representations. In other words, the data in the audio clip file is a record of the level of the sound at each moment of the clip. The FFT calculator 1418 retrieves clips from storage 1414 and performs fast Fourier transforms on the clips to convert the time domain representations to frequency domain representations. The FFT calculator 1418 sends frequency domain representations of the clips to the harmonic product spectrum calculator 1420 and the maximum voice level calculator 1422. The FFT calculator also sends frequency domain information with phase data to storage 1430.

The harmonic product spectrum calculator 1420 determines the fundamental frequencies of sounds in the clip that are (1) harmonic and (2) fundamental frequencies that the human voice can produce. The harmonic product spectrum calculator sends the fundamental frequency data to the maximum voice level calculator 1422. The maximum voice level calculator 1422 determines the maximum amplitude of the identified fundamental frequencies in the clip.

2. Adjusting the Volume of Target Clips

Category 1440, which includes modules that adjust the volume of target clips, includes target clip volume adjustor 1442 and re-synthesizer/inverse fast Fourier transform (IFFT) calculator 1444. Target clip volume adjustor 1442 receives frequency domain representations, with phase data, and maximum voice level data for analyzed clips from storage 1430. In some embodiments, target clip volume adjustor 1442 also receives maximum voice level data from preset selector 1456. Target clip volume adjustor 1442 sends edited frequency domain data IFFT calculator 1444 receives edited frequency domain data from target clip volume adjustor 1442 and performs an inverse fast Fourier transform on the data to generate an edited version of the target clip. The edited version is then saved with the stored clips 1414. In some embodiments, the edited version is saved in a separate location or with a new name in order to preserve the original clip.

3. Storing Preset Values

Category 1450, which includes modules that store the maximum voice level of sample clips, includes a control 1452 for saving presets, a preset storage 1454, and a preset selector 1456. The control 1452 for saving presets receives commands from a user (e.g., by a user clicking on a save-preset tool UI item), retrieves the maximum voice level data from storage 1430 and saves it in preset storage 1454. Preset storage 1454 stores all the saved presets. Preset selector 1456 retrieves the identities and maximum voice level values of the presets from preset storage 1454 and when a preset is selected, sends identifiers (and in some embodiments maximum voice level values) of selected preset to the target clip volume adjustor 1442.

The operations of the various categories of modules are described in relation to the processes carried out by each category of module. Section III.B. describes a process of some embodiments that lifts data from an audio clip. Section III.C. describes a process of some embodiments for stamping an audio clip. Section III.D. describes a process of some embodiments for storing and retrieving lifted data. The operations of the lifting, stamping, and storing processes are described as being performed in some embodiments by specific modules of the software block diagram. However, one of ordinary skill in the art will understand that other embodiments use different modules to perform various operations. For example, some embodiments use a single module, or a different combination of multiple modules, to perform operations described herein as being performed by multiple modules. Some embodiments use multiple modules to perform operations described here as being performed by a single module.

B. Lifting

Figure 15:
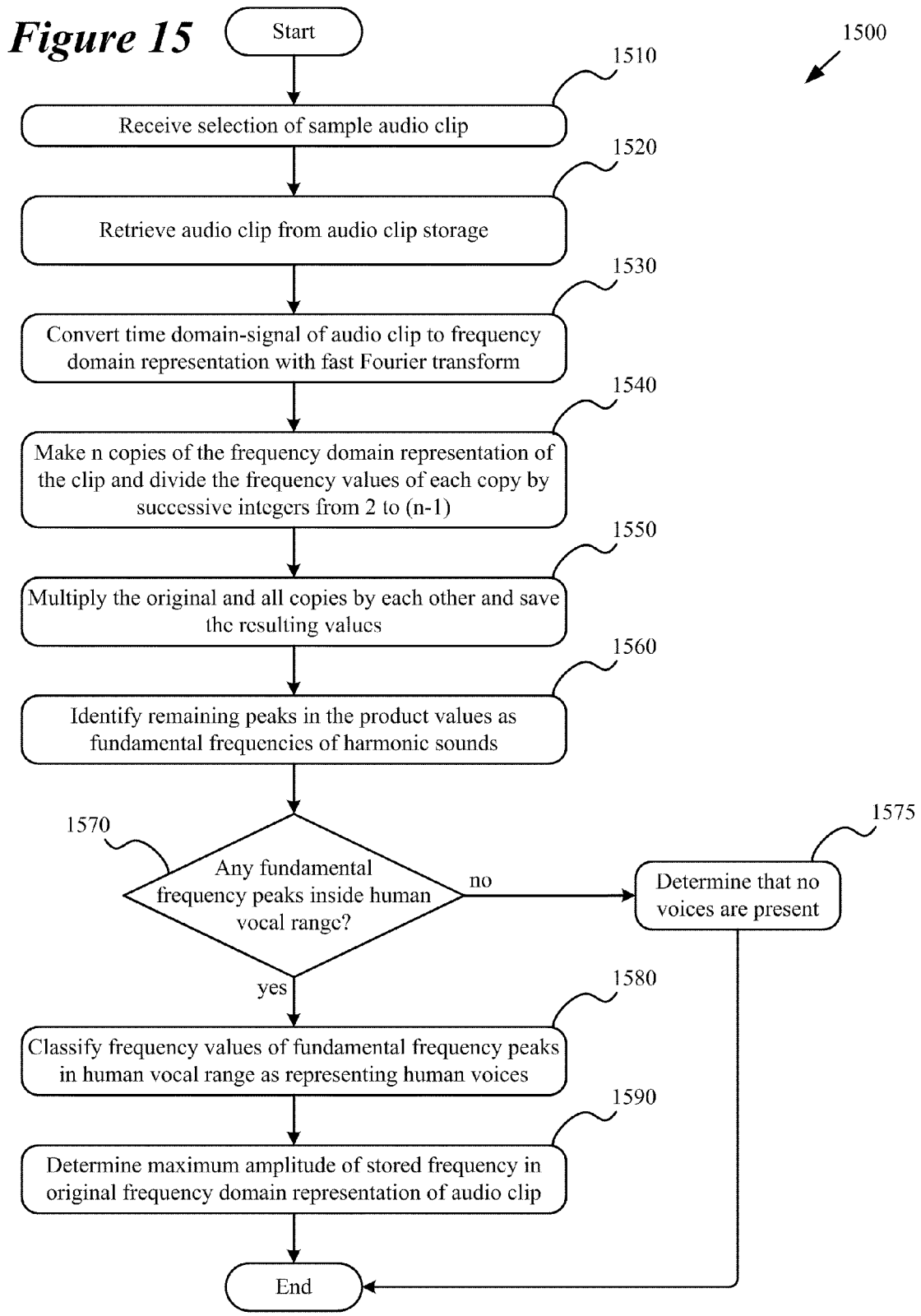
FIG. 15 illustrates a process of some embodiments for lifting data from a sample audio clip.

In some embodiments, the audio adjustment tool lifts data from a sample audio clip to determine the maximum volume of voices in the clip. FIG. 15 illustrates a process 1500 of some embodiments for lifting data from a sample audio clip. The process 1500 begins when it receives (at 1510) a selection of a sample audio clip. In some embodiments, the selection of the sample audio clip is received by the sample clip selector 1412, which passes the selection to the FFT calculator 1418.

Process 1500 retrieves (at 1520) an audio clip from storage. The process converts (at 1530) the time domain representation of the audio clip into a frequency domain representation using some variety of a fast Fourier transform. In some embodiments, the FFT calculator 1418 performs operations 1520-1530 and sends the results to the harmonic product spectrum calculator 1420. The conversion of a time domain representation into a frequency domain representation is described in section IV.A, below.

Figure 16:
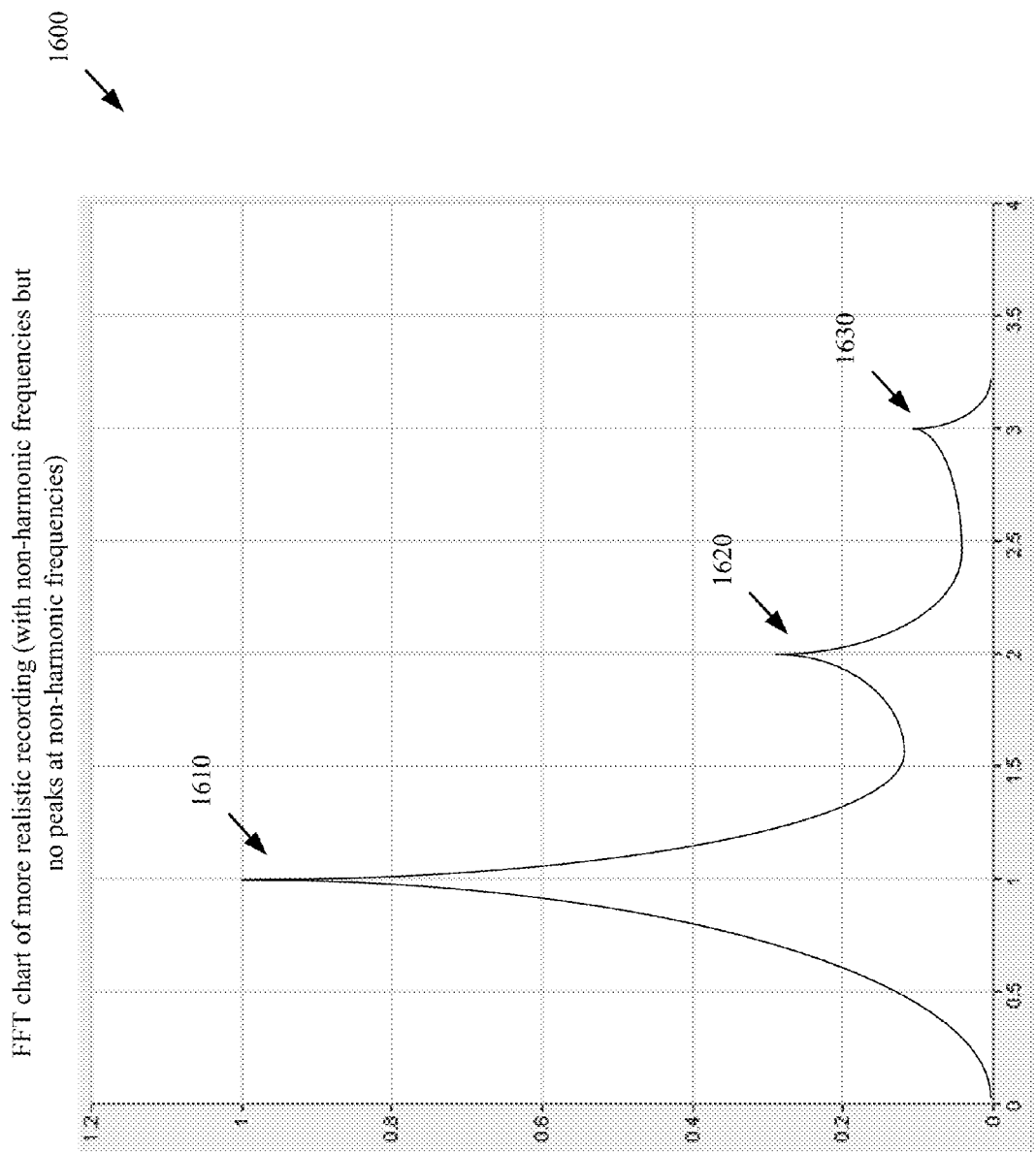
FIG. 16 illustrates a frequency domain representation of a sound clip with a harmonic sound.

The process then performs several operations to identify whether there are human voices in the clip. One characteristic of human voices is that they are harmonic. Harmonic sounds are sounds that include sets of multiple frequencies that are integer multiples of the lowest frequency in the set. The lowest frequency in such a set is called the "fundamental frequency". FIG. 16 illustrates a frequency domain representation of a sound clip with a harmonic sound. FIG. 16 includes graph 1600. Graph 1600 is a graph of amplitude (y-axis) versus frequency (x-axis). Graph 1600 includes peaks 1610, 1620 and 1630. The peaks 1610-1630 are at frequencies of 1, 2, and 3, respectively. Because peak 1620 is two times the frequency of peak 1610, and two is an integer, it is a harmonic frequency of peak 1610. Similarly, peak 1630 is a harmonic frequency of peak 1610 because peak 1630 is three times the frequency of peak 1610.

The process uses the fact that human voices are harmonic to identify sounds as human voices. The process performs operations 1540-1580 to determine the fundamental frequencies of any voices on the media clip. These operations analyze the frequency domain of the clip to determine whether there are harmonic sounds within the range of frequencies that the human voice can produce.

The process makes (at 1540) multiple copies of the frequency domain and divides the frequencies of the copies by successive integers. The process multiplies (at 1550) the original frequency domain representation and the downsampled copies by each other. Multiplying the representations produces data of amplitude versus frequency that reduces any non-harmonic sounds relative to any harmonic sounds. Downsampling and multiplication of frequency domain representations are described in section IV.B.

The process identifies (at 1560) any remaining peaks as fundamental frequencies of harmonic sounds. The process then uses another characteristic of human voices, the frequency range of human voices (approximately 80 Hz to 1100 Hz in some embodiments), to eliminate any harmonic peaks that fall outside the frequency range that human voices can produce. The process determines (at 1570) whether the identified fundamental frequencies are within the range of fundamental frequencies that the human voice is capable of producing. When none of the fundamental frequencies are within the human vocal range, then the process determines (at 1575) that no human voices are in the clip and ends.

When the process determines that the clip does include fundamental frequencies within the human vocal range, the process classifies (at 1580) the fundamental frequencies as representing human voices. In some embodiments, operations 1520-1580 are performed by harmonic product spectrum calculator 1422 which provides the identified fundamental frequencies that it has classified as human voices to the maximum voice level calculator 1422.

The process then determines (at 1590) the maximum amplitude in the original frequency domain representation of the clip of the fundamental frequencies that were classified as human voices. In some embodiments, this determination is made by the maximum voice level calculator 1422, which stores the amplitude in storage 1430. The process 1500 then ends.

C. Stamping

Figure 17:
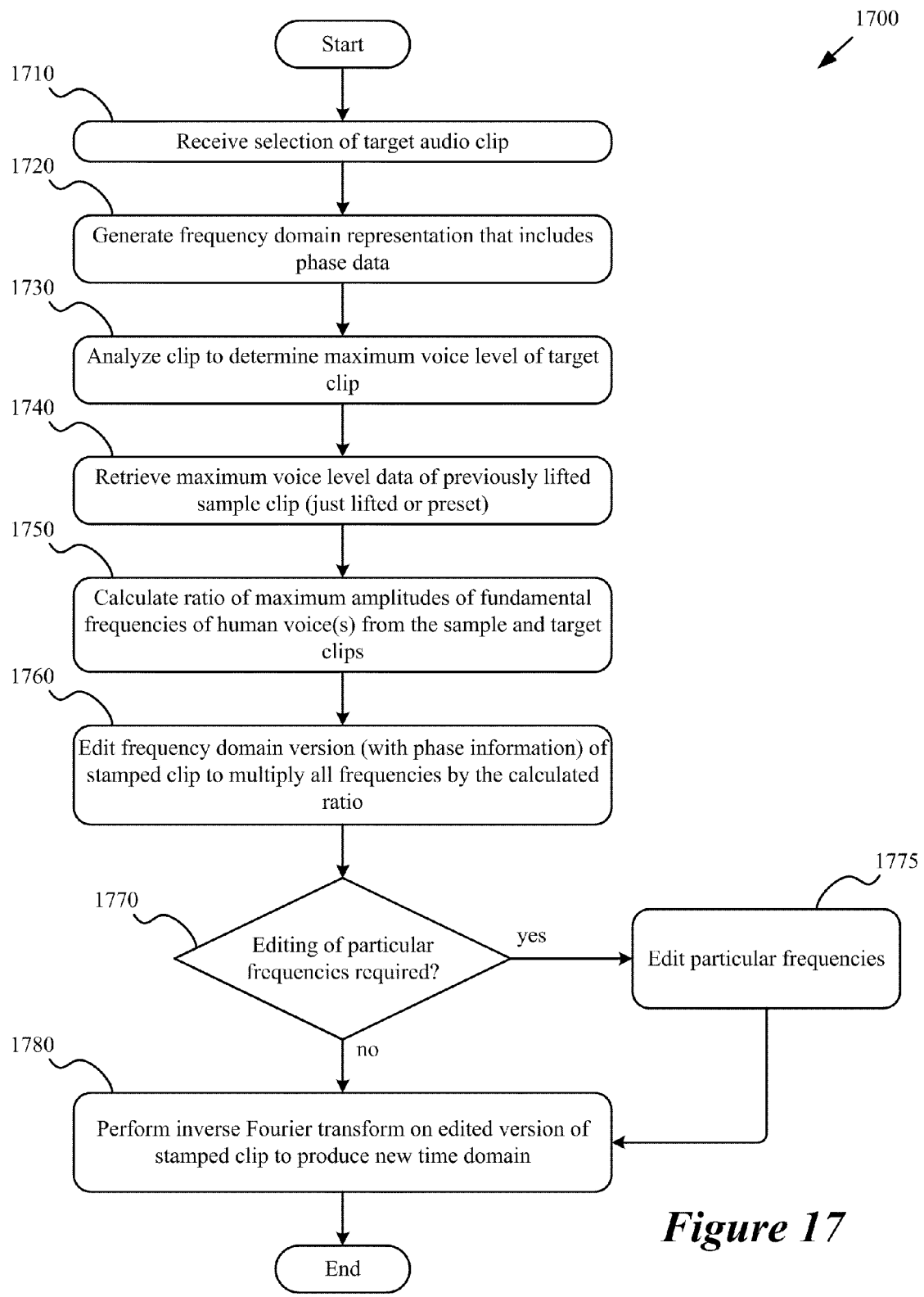
FIG. 17 conceptually illustrates a process of some embodiments for stamping a target audio clip.

In some embodiments, the audio adjustment tool stamps target audio clips to adjust the volume so that the maximum voice volume level of the target audio clips becomes the same as the maximum voice volume level of the sample audio clip. FIG. 17 conceptually illustrates a process 1700 of some embodiments for stamping a target audio clip. The process 1700 begins when it receives (at 1710) a selection of a sample audio clip. In some embodiments, the selection of the sample audio clip is received by the target clip selector 1414, which passes the selection to the FFT calculator 1418.

Process 1700 generates (at 1720) a frequency domain representation of the target audio clip that includes phase data. One of ordinary skill in the art will understand that while amplitude data of a frequency domain representation can be used to calculate the volume of various frequencies, reconstructing a time domain representation from the frequency domain data requires phase data as well as amplitude data. In some embodiments, the fast Fourier transform calculator 1418 generates the frequency domain representation with phase data and then sends the representation to storage 1430.

The process analyzes (at 1730) the target audio clip to determine the maximum voice volume level of the target audio clip. In some embodiments, the analysis of the target clip follows the same process as operations 1540-1590 of process 1500 of FIG. 15. In some embodiments, the same modules that analyze the sample clip (harmonic product calculator 1420 and maximum voice level calculator 1422) analyze the target clip.

The process retrieves (at 1740) the maximum voice level of a previously lifted sample clip. In some embodiments the target clip volume adjustor retrieves the maximum voice level from storage when a sample clip has just been lifted and retrieves the maximum voice level from preset storage 1454 when a preset has been selected. In some embodiments the target volume selector stores the identities of the most recent lifted sample, or preset if a preset was selected more recently than the most recent lift from a sample, and retrieves the maximum voice level of that most recent sample or preset.

The process calculates (at 1750) the maximum voice volume level of the sample and target clips. The process edits the frequency domain representation (with phase data) to multiply the amplitude of all frequencies in the target clip. The process determines (at 1750) whether any particular frequencies needs editing (e.g., to reduce any frequencies that are over a maximum allowed amplitude to below the maximum allowed amplitude in order to prevent clipping or to perform equalization operations). When the process determines that frequencies need further editing, the process edits (at 1775) the frequencies and then goes to operation 1780. When the process determines that the frequencies do not need further editing the process goes directly to operation 1780. In some embodiments, operations 1740-1775 are performed by target clip volume adjustor 1442.

The process then performs (at 1780) an inverse fast Fourier transform on the edited version of the frequency domain representation of the stamped clip to produce a stamped version of the time domain representation of the target clip. In some embodiments this is performed by re-synthesizer/inverse fast Fourier transform calculator 1444. The process then ends.

Process 1700 adjusts the overall volume of the frequency domain representation. However, in some embodiments, the media editor adjusts the volume of the time domain representation of the target clip. That is, the media editor adjusts the volume of the original clip. In embodiments that adjust the volume of the original clip, the inverse Fourier transform is not performed. In some such embodiments, the target clip volume adjustor retrieves and edits the original target clip from storage rather than receiving the frequency domain representation of the clip (with phase data). Some embodiments adjust volume both in the frequency domain and the time domain representations. For example, some embodiments adjust volume in the frequency domain representation in order to make the voice volumes of the sample and target clip match, and then (after the inverse transform has generated a time domain representation) reduce the volume of the time domain representation to eliminate clipping. In some embodiments, when the volume of the target clip is adjusted so that the maximum voice volumes match, the maximum overall volumes of the clips do not match. For example, when a sample clip's loudest sounds are voices and target clip has loud noises that are twice as loud as the voices on the target clip, the adjusted volume of the target clip will have a maximum volume (the volume of the loud noises) that is twice as loud as the maximum volume of the sample clip, even though the maximum volumes of the voices on the sample and target clips will be the same after the adjustment.

D. Presets

Figure 18:
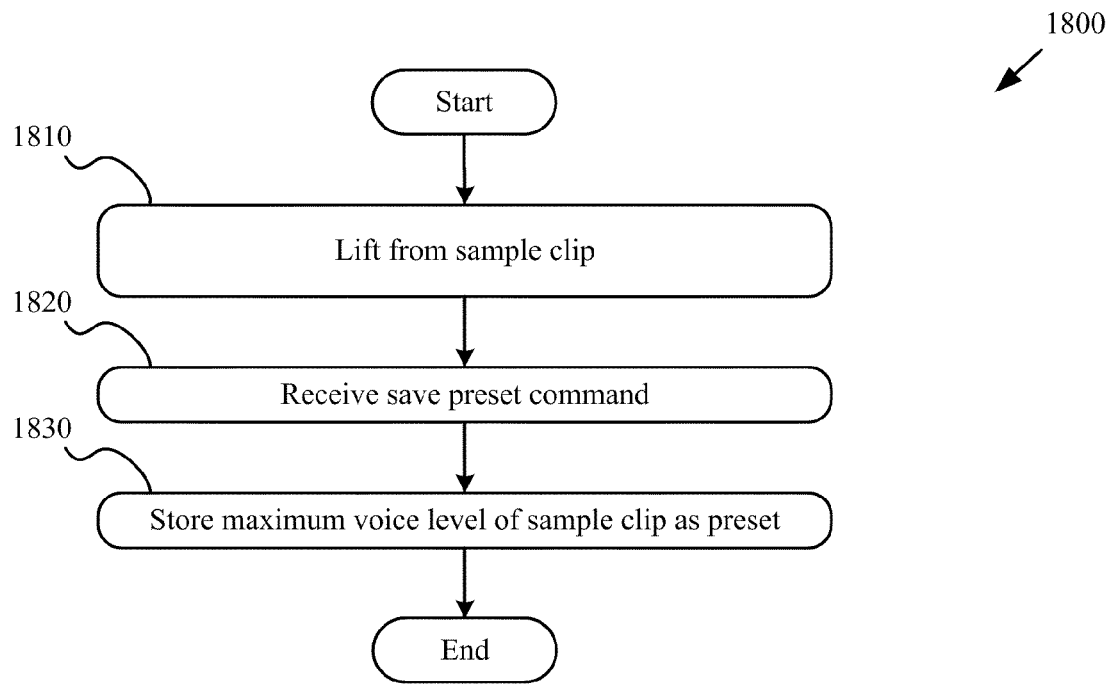
FIG. 18 conceptually illustrates a process of some embodiments for saving lifted data as a preset.

Some embodiments store lifted data as presets and then allow a user to select a preset instead of lifting data from a sample clip. FIG. 18 conceptually illustrates a process 1800 of some embodiments for saving lifted data as a preset. The process lifts (at 1810) data from a sample clip, as previously described in section III.C, above. The process receives (at 1820) a command to save the preset. The process stores (at 1830) the maximum volume level that was lifted from the sample clip as a preset. In some embodiments, control 1452 receives the command to save the preset, retrieves the maximum voice level of the sample from storage 1430, and stores the maximum voice level of the sample as a preset in preset storage 1454. The process then ends.

Figure 19:
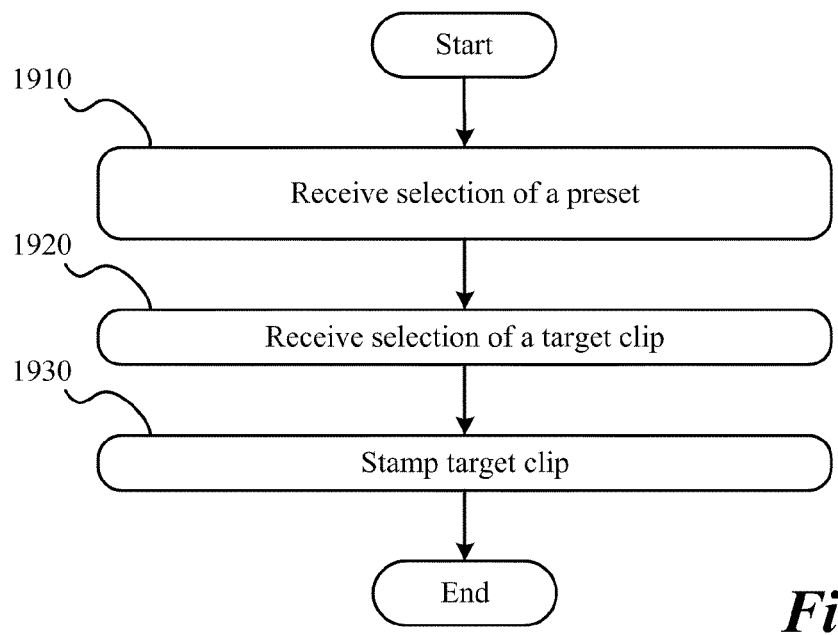
FIG. 19 conceptually illustrates a process of some embodiments for using data from a preset to stamp a target clip.

FIG. 19 conceptually illustrates a process 1900 of some embodiments for using data from a preset to stamp a target clip. The process receives (at 1910) a selection of a previously saved preset. In some embodiments, the preset selector 1456 receives the selection and identifies the preset to the target clip volume adjustor 1442. The process then receives (at 1920) a selection of a target clip. In some embodiments, the selection is received by target clip selector 1416. The process then stamps the target clip, as previously described in section III.C, above. The process then ends.

IV. Analysis of Clips

A. Fourier Transforms and Inverse Fourier Transforms

In some embodiments, the audio clips store information as time domain representation of the data. In other words, the files in which the clips are stored can be represented as a graph of volume level versus time. However, in some embodiments, the analysis of audio clips to determine the volume of human voices uses information about the amplitude of specific frequencies of sound, rather than the overall volume of the sound. Accordingly, some embodiments convert the time domain representation of the data to a frequency domain representation of the data. The conversion process is known as a Fourier transform. Fourier transforms are well known in the art. Some embodiments use a fast Fourier transform, or short term Fourier transform. Fast Fourier transform algorithms and short term Fourier transform algorithms are much faster than actual Fourier transforms, but slightly less accurate in determining the frequencies in a sound wave.

Computing a Fourier transform of a sound wave that changes over time (such as speech) requires time binning. The time domain representation of the data is divided into discrete, short periods of time (bins). The Fourier transform is then applied separately to each bin. The separate application to separate bins is called a discrete Fourier transform. A discrete Fourier transform determines the frequencies of sounds during the times of each bin.

For reasons that are well known in the art, binning without further adjustment of the values of the sound levels in each bin leads to an erroneous increase in the number of higher frequencies identified by the discrete Fourier transform. To reduce these errors, the values of the sound levels in each bin are adjusted so that they go smoothly to zero at the edges of the bin. This process is called "windowing" and is well known in the art.

When the analysis and editing of the frequency domain is complete, an inverse Fourier transform is performed on the edited frequency domain to create a time domain representation of the edited clip. Inverse Fourier transforms are also well known in the art.

Any fast Fourier transform (or short term Fourier transform) and its corresponding inverse transform can be used with some embodiments. Some examples of such fast Fourier transforms of some embodiments are the Prime-Factor algorithm, the Cooley-Tukey algorithm, the split-radix variant of the Cooley-Tukey algorithm, the Bruun algorithm, the Winograd algorithm, Rader's algorithm, and the chirp-z algorithm.

Figure 20:
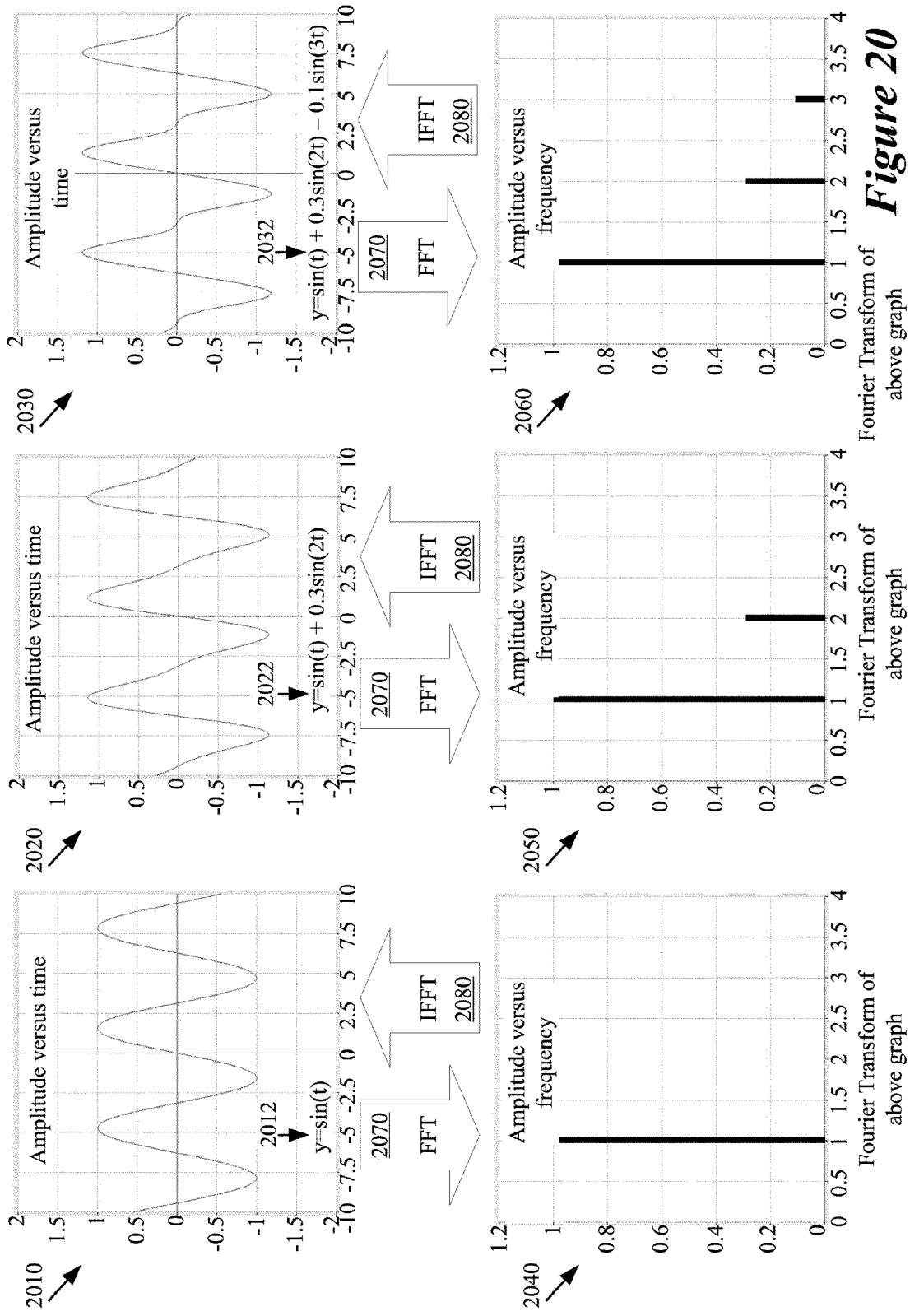
FIG. 20 illustrates the results of applying a Fourier transform to various time domain graphs and inverse Fourier transforms to various frequency domain graphs.

FIG. 20 illustrates the results of applying a Fourier transform to various time domain graphs and inverse Fourier transforms to various frequency domain graphs. FIG. 20 includes time domain graphs 2010, 2020, and 2030, frequency domain graphs 2040, 2050, and 2060, and graphical representations of the fast Fourier transform 2070 that converts the time domain graphs into frequency domain graphs and the inverse fast Fourier transform 2080 that convert the frequency domain graphs into time domain graphs. Time domain graphs 2010-2030 are produced by functions 2012, 2022, and 2032, respectively. The amplitudes of the sine waves that make up each time domain graph determine the height of the spikes on the frequency domain graphs. The frequency of the sine waves in a time domain graph (i.e., the numbers just before the "t") in the functions determines the frequency (in multiples of pi) of the spike on the frequency domain graph.

B. Harmonic Product Spectrum

FIG. 21 illustrates the identification of harmonic frequencies. FIG. 21 includes original frequency domain representation 2110, a first copy 2120 of the frequency domain representation that has been downsampled (frequencies divided by) a factor of two, a second copy 2130 of the frequency domain representation that has been downsampled by a factor of three, a graph 2140 that is the product of the first two frequency domain representations and a graph 2150 that is the product of all three frequency domain representations. Original frequency domain representation 2110 includes harmonic peaks 2112, 2114, 2116, and 2118 that are at frequencies 1, 2, 3, and 4, respectively, and peak 2119 that is at frequency 1.7. The frequencies of peaks 2114, 2116, and 2118 are integer multiples of the frequency of peak 2112, therefore peaks 2114, 2116, and 2118 are harmonics of peak 2112 (the lowest frequency of the harmonic set). Therefore, the frequency of peak 2112 is the fundamental frequency and the frequencies of peaks 2114, 2116, and 2118 are harmonic frequencies of the frequency of peak 2112.

Downsampling a frequency domain representation of a sound wave by integer multiples aligns successive harmonic frequencies with the fundamental frequency. For example, if a harmonic frequency is twice the fundamental frequency then downsampling by a factor of two will result in a frequency domain representation in which the peak representing the harmonic frequency (twice the fundamental frequency) is shifted to the fundamental frequency (two divided by two).

Peak 2114 has a frequency of 2. When the frequency domain is downshifted by a factor of two in frequency domain 2120, peak 2114 is shifted to a frequency of 1. Accordingly, multiplying frequency domain 2110 and frequency domain 2120 produces a non-zero result, peak 2142 in graph 2140. Peak 2114 in the original frequency domain 2110 has the same frequency (i.e., 2) as shifted peak 2118 in frequency domain 2120. Therefore, the product of the frequency domains 2110 and 2120 (shown in graph 2140) contains a non-zero peak 2144 at the original frequency of peak 2114.

In contrast, non-harmonic frequency 2119, with a frequency of 1.7, does not align with any peaks in downsampled frequency domain 2120. Therefore, the product of the two frequency domains is zero, as shown by the lack of a peak at a frequency of 1.7 in graph 2140.

Peak 2116 has a frequency of 3. When the frequency domain is downshifted by a factor of three in frequency domain 2130, peak 2116 is shifted to a frequency of 1. Because all the frequency domains include a peak at a frequency of 1, the product of the three frequency domains (shown as graph 2150) contains a peak 2152 at a frequency of 1. Because there is no peak at a frequency of 2 in downsampled frequency domain 2130, the product of the three frequency domains (shown in graph 2150) does not include a peak at a frequency of 2.

The frequency domains illustrated in FIG. 21 are idealized. Actual sound waves usually include a mixture of frequencies. The frequency domain representation of an actual harmonic sound will have gradual peaks such as the peaks shown in FIG. 16 rather than spikes, such as the peaks shown in FIG. 21. Therefore, in an actual harmonic product spectrum calculation, multiplying the frequency domains will strengthen fundamental frequencies relative to the non-harmonic frequencies, rather than reducing the non-harmonic frequencies to zero. The frequencies used in FIG. 21 were chosen to simplify the calculations of the downsampled frequencies. One of ordinary skill in the art will understand that the harmonic product spectrum calculations also apply to harmonic sounds at other frequencies. In some embodiments, the media editing application uses more than two downsampled frequency domains. Some embodiments use, three, four, five, or even larger numbers of downsampled frequency domains.

VI. Process for Designing a Media Editing Application

A computer readable medium for storing a program for implementing the above software architecture of the media (or audio) editing application can be manufactured by defining one or more modules that can perform the operations and functionalities described above and storing the modules on the computer readable medium. An example of manufacturing a computer readable storage medium that stores a computer program for performing the above features is described below with reference to FIG. 22. In some embodiments, the computer readable storage medium is a disk (e.g., CD, DVD, hard disk, etc.) or a solid-state storage device (e.g., flash memory). In some embodiments, the computer readable storage medium is only a CD.

Figure 22:
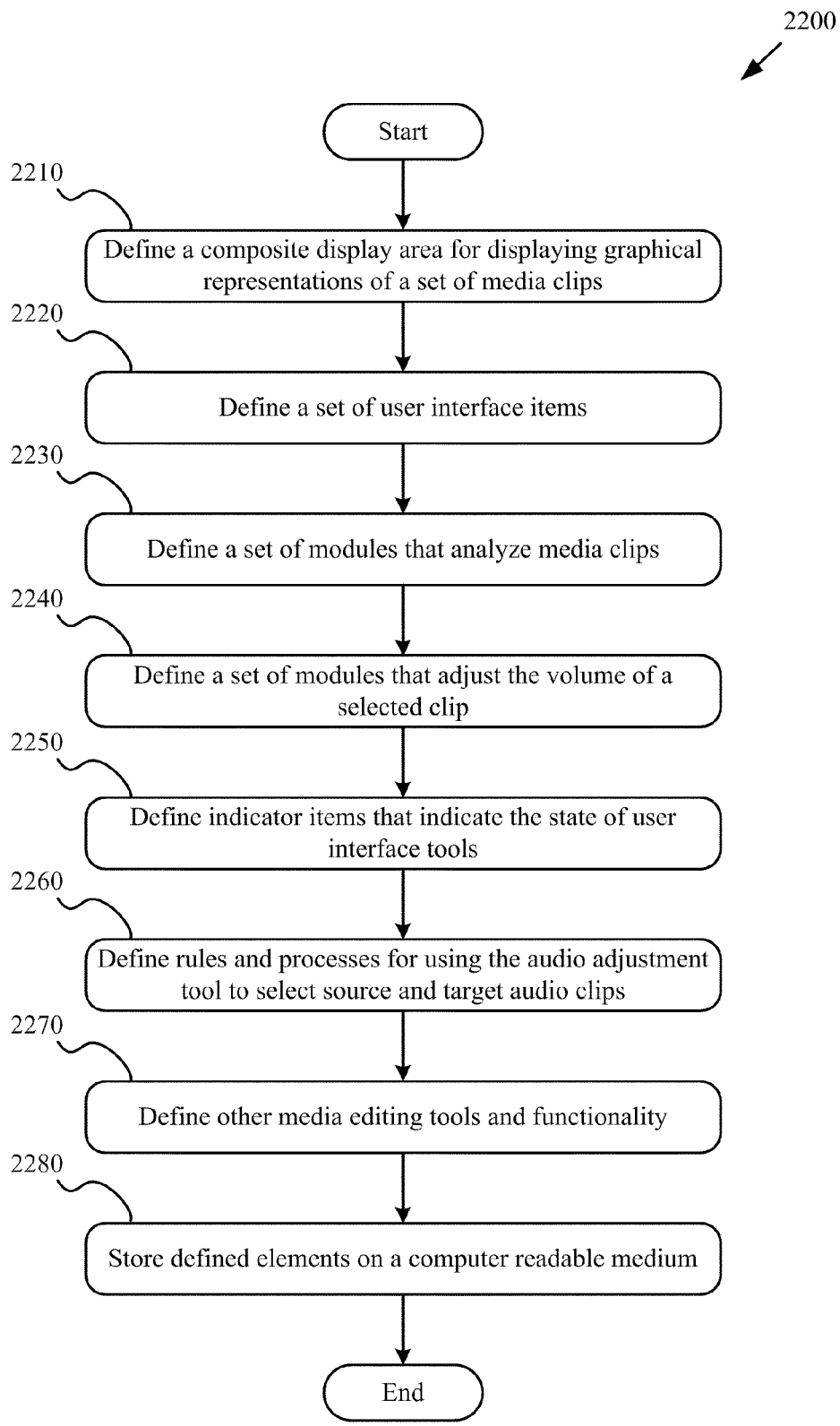
FIG. 22 conceptually illustrates a process of some embodiments for defining a media-editing application of some embodiments.

FIG. 22 conceptually illustrates a process 2200 of some embodiments for defining a media-editing application of some embodiments. Specifically, process 2200 illustrates the operations used to define several of the objects and tools described above. As shown in FIG. 22, the process 2200 begins by defining (at 2210) a composite display area for displaying graphical representations of a set of media clips. The clip timeline display area 120 FIG. 1 is one example of such a display area.

The process then defines (at 2220) a set of user interface items. The audio adjustment UI item 110 and the save-preset UI item 145 described above are examples of such user interface items. Next, the process defines (at 2230) a set of modules for analyzing clips. The modules illustrated in FIG. 14, category 1410 are examples of such modules. The process defines (at 2240) a set of modules for adjusting the volume of selected clips. The modules illustrated in FIG. 14, category 1440 are examples of such modules.

The process then defines (at 2250) indicator items for indicating the state of user interface tools. For example, the shape of cursor 157 to indicate that an audio adjustment tool is ready to lift data from a clip and the shape of cursor 165 to indicate that the audio adjustment tool is ready to stamp a clip. In some embodiments, the process 2200 defines (at 2260) rules and processes for using the audio adjustment tool to select source and target clips. For example, the rules that state that after the audio adjustment UI item 110 is clicked the clip selected will be the source clip and the process that includes changing the shape of the cursor when it is over a selectable clip. The process 2200 then defines (at 2270) other media editing tools and functionalities. Examples of such editing tools include tools that provide zooms, color enhancement, blemish removal, audio mixing, adjustments of various frequencies, adjustments the volumes of various frequencies, boosts of treble, bass or midrange frequencies, fade-ins on clips, fade-outs on clips, composite clips, overlapping clips and fades of one clip in while another fades out, saving multiple edited clips as single clips, splitting single clips into multiple clips, etc.

In addition, various other media editing functionalities are defined in some embodiments. Such functionalities may include library functions, format conversion functions, etc. In some embodiments, the process defines these additional tools in order to create a media editing application that has many features in addition to the features described above. The process 2200 then stores (at 2280) the defined elements on a computer readable storage medium and ends. In some embodiments, the computer readable storage medium is a disk (e.g., CD, DVD, hard disk, etc.) or a solid-state storage device (e.g., flash memory).

One of ordinary skill in the art will recognize that the various elements defined by process 2200 are not exhaustive of the modules, rules, processes, and UI items that could be defined and stored on a computer readable storage medium for a media editing application incorporating some embodiments of the invention. In addition, the process 2200 is a conceptual process, and the actual implementations may vary. For example, different embodiments may define the various elements in a different order, may define several elements in one operation, may decompose the definition of a single element into multiple operations, etc. In addition, the process 2200 may be implemented as several sub-processes or combined with other operations within a macro-process.

Figure 23:
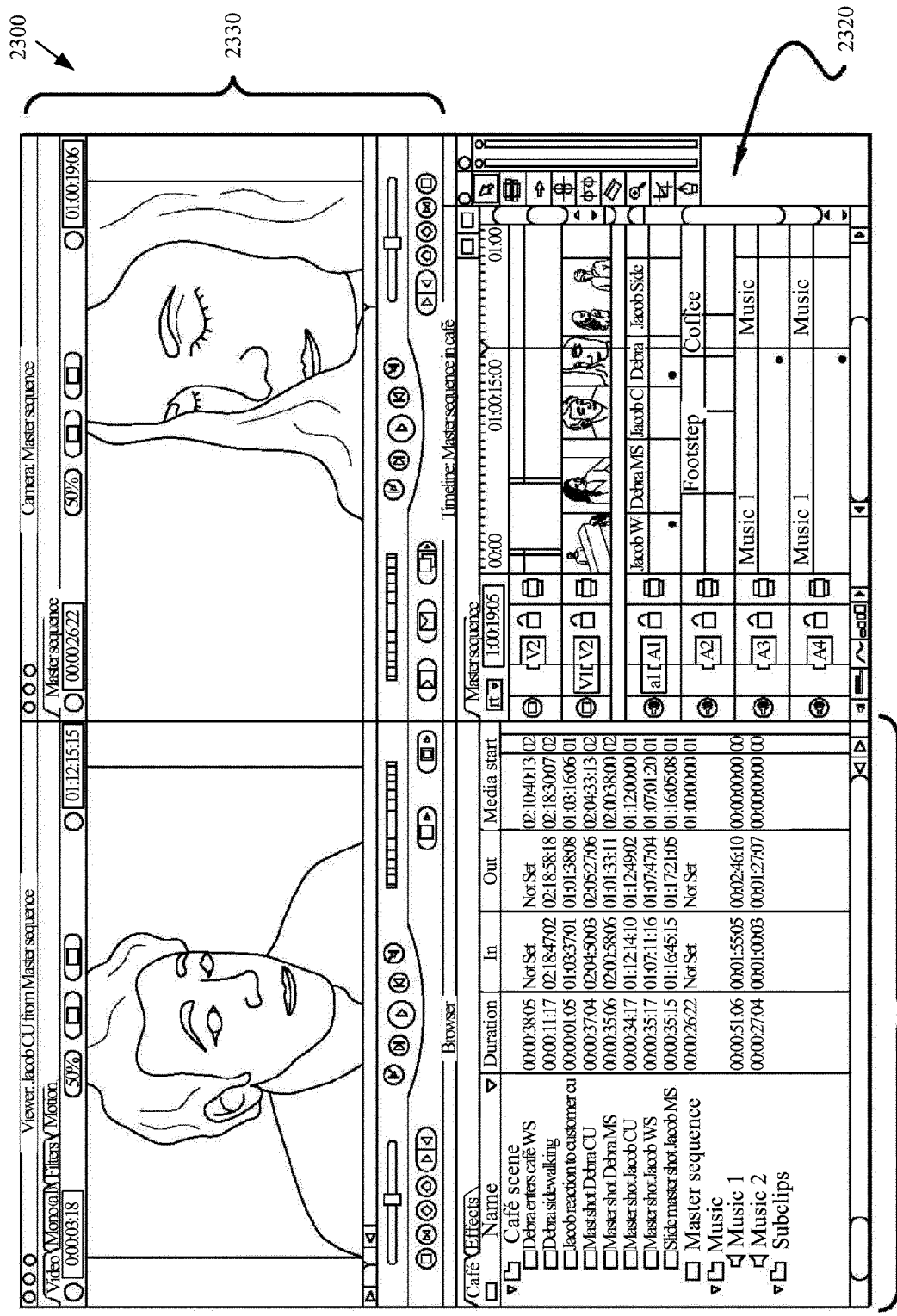
FIG. 23 illustrates a more detailed view of a media editing application with some additional features

FIG. 23 illustrates a more detailed view of a media editing application with some additional features in addition to the features described above. Specifically, this figure shows a media editing application with these additional tools. FIG. 23 illustrates a list of video and/or audio clips 2310, video editing tools 2320, and video displays 2330. The list of clips 2310 includes video clips along with metadata (e.g., timecode information) about the video clips. In some embodiments, the list of video clips is the list of video clips in a particular sequence of video clips, and the metadata specifies in and out points, durations, etc. for the video clips.

The video editing tools 2320 include tools that allow a user to graphically set in and out points for video clips (in other words, where in the final product a specific clip or part of a clip will be shown). For instance, the video editing tools 2320 include a number of timelines that can be used to modify the temporal sequence of the video frame and to synchronize audio tracks with video tracks (e.g., in order to add music over a video clip). In some embodiments, video editing tools 2320 also give users the ability to edit in effects or perform other video editing functions.

Video displays 2330 allow a user to watch multiple video clips at once, thereby enabling easier selection of in and out points for the video clips. The screen shot 2300 illustrates a few of many different editing tools that a video editing application of some embodiments has to edit digital video.

In some cases, some or all of the video clips that are displayed in the list of clips 2310, played in displays 2330, and edited by a user with video editing tools 2320, are video clips of real-world objects (e.g., people, landscapes, etc.) filmed by a camera and include real-world audio (e.g., conversations, real-world noises, etc.) recorded by a camera, microphone, etc. In some cases, some or all of the video clips are computer-generated animations or include computer generated animations (e.g., animated objects, computer-generated effects, etc.).

The functions of the audio adjustment tool can also be implemented as part of a more general audio editing application. For example, some embodiments provide an audio editing application that adjusts various frequencies, adjusts the volumes of various frequencies, boosts treble, bass or midrange frequencies, fades in on clips, fades out on clips, composites clips, overlaps clips and fades one clip in while fading another out, saves multiple edited clips as single clips, splits single clips into multiple clips, etc.

VII. Computer System

Many of the above-described processes and modules are implemented as software processes that are specified as a set of instructions recorded on a computer readable storage medium (also referred to as a computer readable medium or a machine readable medium). When these instructions are executed by one or more computational element(s) (such as processors or other computational elements like ASICs and FPGAs), they cause the computational element(s) to perform the actions indicated in the instructions. Computer is meant in its broadest sense (within the field of computing devices), and can include any electronic device with a processor. Examples of computer readable media include, but are not limited to, CD-ROMs, flash drives, RAM chips, hard drives, EPROMs, etc.

As used in this specification and any claims of this application, the terms "computer", "server", "processor", and "memory" all refer to electronic or other technological devices. These terms exclude people, groups of people, or aspects of people (e.g., the term "memory" as used herein does not include human memory). For the purposes of the specification, the terms "display" (as a verb) or "displaying" means displaying by an electronic device. The term "displaying" excludes handwriting on paper, painting, and other forms of creating an image that do not involve electronic devices. As used in this specification and any claims of this application, the terms "computer readable medium" and "computer readable media" are entirely restricted to tangible, physical objects that store information in a form that is readable by a computer and/or other electronic devices. These terms exclude any carrier waves, wireless signals, wired download signals, electronic signals, and any other ephemeral signals.

In this specification, the term "software" is meant to include firmware residing in physical devices such as read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs when installed to operate on one or more computer systems define one or more specific machine implementations that execute and perform the operations of the software programs.

Figure 24:
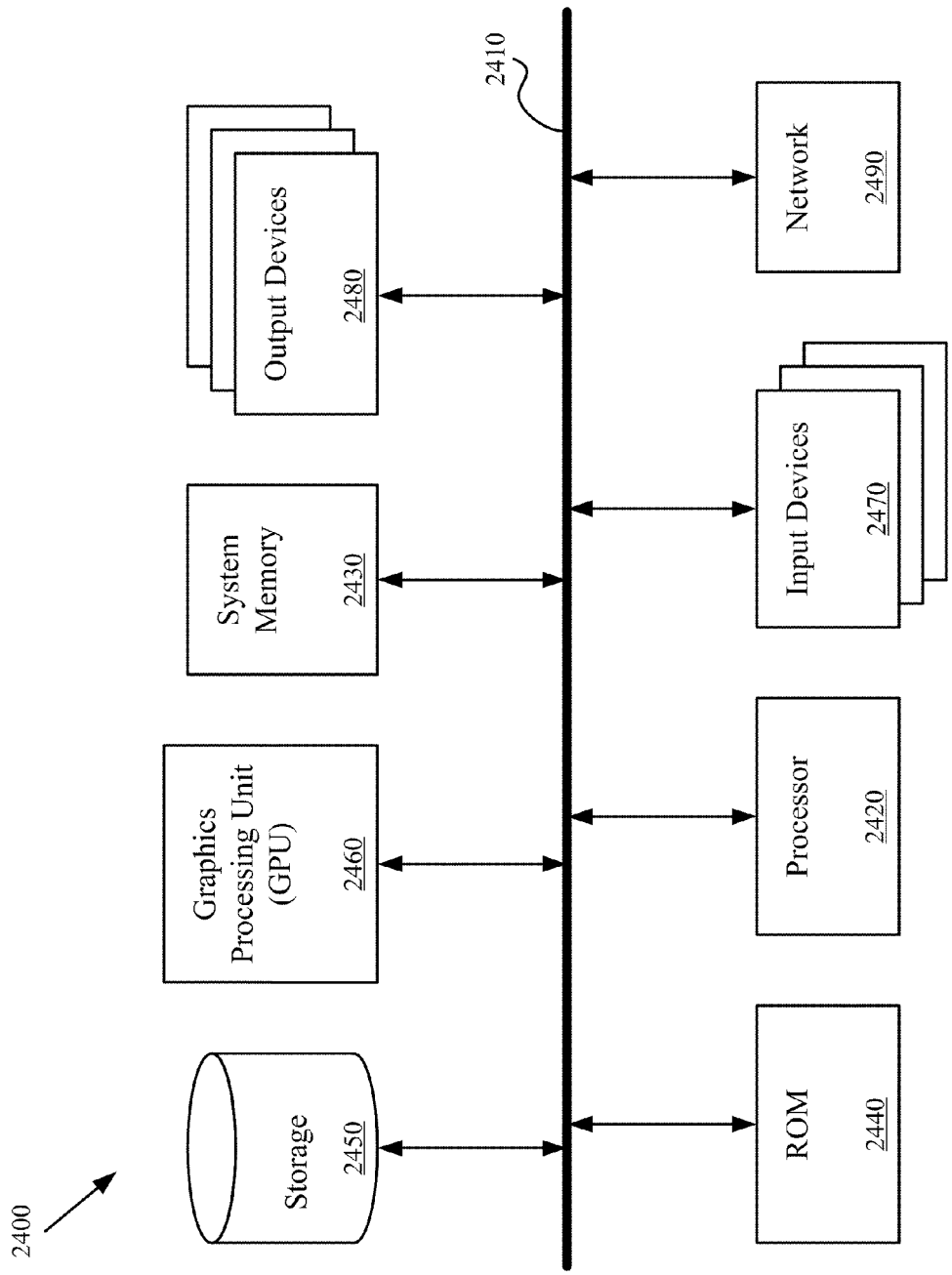
FIG. 24 illustrates a computer system with which some embodiments of the invention are implemented.

FIG. 24 conceptually illustrates a computer system 2400 with which some embodiments of the invention are implemented. The computer system includes various types of computer readable mediums and interfaces for various other types of computer readable mediums. Computer system 2400 includes a bus 2410, a processor 2420, a system memory 2430, a read-only memory (ROM) 2440, a permanent storage device 2450, a graphics processing unit (GPU) 2460, input devices 2470, output devices 2480, and a network connection 2490.

The bus 2410 collectively represents all system, peripheral, and chipset buses that support communication among internal devices of the computer system 2400. For instance, the bus 2410 communicatively connects one or more processors 2420 with the system memory 2430, the read-only memory 2440, and the permanent storage device 2450.

From these various memory units, the processor 2420 retrieves instructions to execute and data to process in order to execute the processes of the invention. In some embodiments the processor comprises a Field Programmable Gate Array (FPGA), an ASIC, or various other electronic components for executing instructions. The read-only-memory (ROM) 2440 stores static data and instructions that are needed by the processor 2420 and other modules of the computer system. The permanent storage device 2450, on the other hand, is a read-and-write memory device. This device is a non-volatile memory unit that stores instructions and data even when the computer system 2400 is off. Some embodiments of the invention use a mass-storage device (such as a magnetic or optical disk and its corresponding disk drive) as the permanent storage device 2450. Some embodiments use one or more removable storage devices (flash memory card or memory stick) as the permanent storage device 2450. Some embodiments use a removable storage device (such as a floppy disk, flash drive, or CD-ROM) as the permanent storage device.

Like the permanent storage device 2450, the system memory 2430 is a read-and-write memory device. However, unlike storage device 2450, the system memory 2430 is a volatile read-and-write memory, such as a random access memory (RAM). The system memory stores some of the instructions and data that the processor needs at runtime.

Instructions and/or data needed to perform processes of some embodiments are stored in the system memory 2430, the permanent storage device 2450, the read-only memory 2440, or any combination of the three. For example, the various memory units include instructions for processing multimedia items in accordance with some embodiments. From these various memory units, the processor 2420 retrieves instructions to execute and data to process in order to execute the processes of some embodiments.

In some embodiments, the bus 2410 connects to the GPU 2460. The GPU of some embodiments performs various graphics processing functions. These functions may include display functions, rendering, compositing, and/or other functions related to the processing or display of graphical data.

The bus 2410 also connects to the input and output devices 2470 and 2480. The input devices 2470 enable the user to communicate information and select commands to the computer system. The input devices 2470 include alphanumeric keyboards, touch-screens, and cursor-controllers. The input devices also include audio input devices (e.g., microphones, MIDI musical instruments, etc.) and video input devices (e.g., video cameras, still cameras, optical scanning devices, etc.).

The present application describes a graphical user interface that provides users with numerous ways to perform different sets of operations and functionalities. In some embodiments, these operations and functionalities are performed based on different commands that are received from users through different input devices (e.g., keyboard, trackpad, touchpad, mouse, etc). For example, the present application describes the use of a cursor in the graphical user interface to control (e.g., select, move) objects in the graphical user interface. However, in some embodiments, objects in the graphical user interface can also be controlled or manipulated through other control, such as touch control. In some embodiments, touch control is implemented through an input device that can detect the presence and location of touch on a display of the device. An example of such a device is a touch screen device. In some embodiments, with touch control, a user can directly manipulate objects by interacting with the graphical user interface that is displayed on the display of the touch screen device. For instance, a user can select a particular object in the graphical user interface by simply touching that particular object on the display of the touch screen device. As such, in some embodiments when touch control is utilized, a cursor is not even provided for enabling selection of an object of a graphical user interface. However, when a cursor is provided in a graphical user interface, touch control can be used to control the cursor in some embodiments.

The output devices 2480 include printers, electronic display devices that display still or moving images, and electronic audio devices that play audio generated by the computer system. Electronic display devices in some embodiments display the graphical aspects of a graphical user interface (GUI). Electronic display devices include devices such as cathode ray tubes (CRT), liquid crystal displays (LCD), light emitting diode displays (LED) including organic light emitting diode displays (OLED), plasma display panels (PDP), surface-conduction electron-emitter displays (alternatively referred to as a "surface electron display" or SED), electronic paper, etc. Audio output devices include a PC's sound card and speakers, a speaker on a cellular phone, a Bluetooth® earpiece, etc. Some or all of these output devices may be wirelessly or optically connected to the computer system.

Finally, as shown in FIG. 24, bus 2410 also couples computer 2400 to a network 2490 through a network adapter (not shown). In this manner, the computer can be a part of a network of computers (such as a local area network (LAN), a wide area network (WAN), or an Intranet) or a network of networks (such as the Internet). For example, the computer 2400 may be coupled to a web server (through network 2490) so that a web browser executing on the computer 2400 can interact with the web server as a user interacts with a GUI that operates in the web browser.

Any or all of the components of computer system 2400 may be used in conjunction with the invention. However, one of ordinary skill in the art will appreciate that any other system configuration may also be used in conjunction with the invention or components of the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., USB drives, flash drives, SD cards, mini-SD cards, micro-SD cards, etc.), magnetic and/or solid state hard drives, read-only and recordable blu-ray discs, ultra density optical discs, any other optical or magnetic media, and floppy disks.

The computer-readable media stores a computer program that is executable by at least one processor and includes sets of instructions for performing various operations. Examples of hardware devices configured to store and execute sets of instructions include, but are not limited to application specific integrated circuits (ASICs), field programmable gate arrays (FPGA), programmable logic devices (PLDs), ROM, and RAM devices. Examples of computer programs or computer code include machine code, such as produced by a compiler, and files including higher-level code that are executed by a computer, an electronic component, or a microprocessor using an interpreter. In some embodiments, the hardware includes one or more of the above described computer-readable medium, memory, or storage.

It should be recognized by one of ordinary skill in the art that any or all of the components of computer system 2400 may be used in conjunction with the invention. Moreover, one of ordinary skill in the art will appreciate that any other system configuration may also be used in conjunction with the invention or components of the invention.

While the invention has been described with reference to numerous specific details, one of ordinary skill in the art will recognize that the invention can be embodied in other specific forms without departing from the spirit of the invention. For example, several embodiments were described above by reference to particular media editing applications with particular features and components (e.g., particular composite display areas). However, one of ordinary skill will realize that other embodiments might be implemented with other types of media editing applications with other types of features and components (e.g., other types of composite display areas).

Moreover, while the examples shown illustrate many individual modules as separate blocks, one of ordinary skill in the art would recognize that some embodiments combine these modules into a single functional block or element. One of ordinary skill in the art would also recognize that some embodiments divide a particular module into multiple modules.

Many references have been made to adjusting volume based on human voice levels. However, one of ordinary skill in the art will understand that other embodiments adjust the volume of clips based on other characteristics of the sound besides maximum voice volume. For example, musical instruments produce harmonic sounds and some embodiments could adjust the volumes of stamped clips based on the volume of musical instruments. In fact, some embodiments may incorrectly identify the sounds of musical instruments as human voices, if the musical instruments have fundamental frequencies within the human voice range.

Some embodiments include controls to change or narrow the range of frequencies that will be identified as a human voice. One example of when this could be of use is when a deep human voice is one the same audio clip as a musical instrument that is higher than the voice on the clip, but still within the usual frequency range of human voices.

Another example of the usefulness of changing the acceptable range would be if an audio clip has two voices, one which is supposed to maintain a level volume, and one which is intended to shout in some clips whisper in other clips, the range of frequencies used to determine the volume adjustment could be set to the range of the person whose voice is intended to remain level. One of ordinary skill in the art will also realize that some embodiments use characteristics other than harmonic sounds to determine volume adjustments.

Cursor operations can be managed any number of ways, e.g., use of a mouse, trackpad, etc., but also touch screen based operations. Some embodiments do not even have cursor for enabling selection in touch screen approaches. The media editing application can be a standalone application on a desktop, part of another program (e.g., part of the OS), part of a server based solution (fat client, thin client/browser based/web based), etc., or some combination of the preceding.

One of ordinary skill in the art will realize that, while the invention has been described with reference to numerous specific details, the invention can be embodied in other specific forms without departing from the spirit of the invention. For instance, alternate embodiments are implemented by using a generic processor to implement the video processing functions instead of using a GPU. One of ordinary skill in the art would understand that the invention is not to be limited by the foregoing illustrative details, but rather is to be defined by the appended claims.

We claim:

1. A method comprising:
providing a first representation of a sample audio clip;
providing a second representation of a target audio clip;
determining the sample audio clip is selected in a user interface, the sample audio clip comprising a sample voice and other audio elements in addition to the voice;
parsing the sample audio clip to determine a sample maximum voice volume in isolation from the other audio elements in the sample audio clip;
determining the target audio clip is selected in the user interface, the target audio clip comprising a target voice; and
adjusting automatically, a target maximum voice volume of the target audio clip to match the sample maximum voice volume of the sample audio clip.

2. The method of claim 1, wherein the user interface comprises one tool, the one tool comprising a user interface item for activating a set of computer software modules that analyze the sample audio clip and for adjusting the volume of the target audio clip.

3. The method of claim 2, wherein the one tool further comprises an indicator item, wherein the indicator item comprises a cursor with a different shape than a standard cursor.

4. The method of claim 1, wherein the data derived from the selection of the sample audio clip is saved as a preset and the preset is used to automatically adjust a plurality of target audio clips to the sample maximum voice volume.

5. The method of claim 1, wherein at least one of the sample and target audio clips comprise a media clip with video as well as sound.

6. The method of claim 1, wherein determining the sample and target maximum particular volumes comprises:
identifying fundamental frequencies of harmonic sounds in the sample audio clip, and
identifying fundamental frequencies of harmonic sounds in the target audio clip.

7. The method of claim 6, wherein determining the sample and target maximum voice volumes further comprises:
identifying a subset of the frequencies wherein the subset is within a range of fundamental frequencies produced by human voices.

8. The method of claim 1, wherein the adjusting further comprises:
calculating a ratio of the sample maximum voice volume to the target maximum particular voice volume, and
multiplying the volume of the target audio clip by the ratio.

9. The method of claim 8, wherein the multiplying further comprises multiplying each frequency in a frequency domain representation of the target audio clip by the ratio and converting the multiplied frequency domain representation of the target audio clip to a time domain representation.

10. The method of claim 1, wherein the determining the sample maximum voice volume of the sample audio clip comprises converting the sample audio clip from a time domain representation of a recorded sound to a frequency domain representation of the recorded sound and identifying a maximum amplitude of a frequency of a particular type of sound.

11. The method of claim 1, wherein adjusting the volume of the target audio clip so that the target maximum voice volume of the target audio clip matches the sample maximum voice volume of the sample audio clip does not adjust a maximum volume of the target audio clip to match a maximum volume of the sample audio clip.

12. The method of claim 1, wherein the user interface further comprises a tool for storing a maximum voice volume level of the sample audio clip and a tool for retrieving the maximum voice volume level of the sample audio clip for subsequent use in adjustment of the volume of a subsequently selected third audio clip.

13. A computer readable non-transitory medium storing a computer program for editing audio clips, the computer program executable by at least one processor, the computer program comprising sets of instructions for:
receiving a selection of a sample audio clip and a selection of a target audio clip with a target maximum voice volume as a target for volume adjustment, wherein the sample audio clip comprises a sample voice and other audio elements in addition to the voice;
parsing the sample audio clip to determine a sample maximum voice volume in isolation from the other audio elements in the sample audio clip;
and
adjusting the target maximum voice volume of the target audio clip to match the sample maximum voice volume.

14. The computer readable medium of claim 13, wherein the sample audio clip is a subsection selected from a longer audio clip.

15. The computer readable medium of claim 14, wherein the set of instructions for adjusting the volume of the target audio clip comprises a set of instructions for multiplying the volume of the target audio clip by a ratio of the sample maximum voice volume and the target maximum voice volume.

16. The computer readable medium of claim 13, wherein at least one of the sample and target audio clips comprise a media clip with video as well as sound.

17. The computer readable medium of claim 13, wherein the set instructions for determining the sample maximum voice volume identifies the sample maximum voice volume as a maximum power of a fundamental frequency of a harmonic sound on the sample audio clip, wherein the fundamental frequency is within a frequency range produced by human voices.

18. The computer readable medium of claim 13, wherein a maximum volume level of an audio clip comprises a maximum power of any frequency of sound on the audio clip and adjusting the volume of the target audio clip results in the target audio clip having a maximum voice volume that does not match a maximum volume of the sample audio clip.

19. The computer readable medium of claim 13, wherein a maximum voice volume level of an audio clip comprises a maximum amplitude of the audio clip and adjusting the volume of the target audio clip results in the target audio clip having a maximum voice volume that does not match a maximum voice volume of the sample audio clip.

20. The computer readable medium of claim 13, wherein the maximum voice volume of an audio clip comprises a maximum amplitude of a fundamental frequency of a harmonic sound on the audio clip, wherein the fundamental frequency is within a frequency range produced by human voices.

21. The computer readable medium of claim 13, wherein the set of instructions for determining a maximum voice volume of an audio clip comprise sets of instructions for
translating the audio clip from a time domain representation of sound to a frequency domain representation of the sound;
identifying a set of fundamental frequencies of harmonic sounds on the audio clip;
identifying a subset of fundamental frequencies that are within a human voice range; and
determining a maximum magnitude in the audio clip of fundamental frequencies in the subset.

22. The computer readable medium of claim 13, wherein the computer program further comprises a set of instructions for adjusting the target audio clip to make the target, maximum voice volume of the target audio clip less than a preset maximum allowed volume of an audio clip.

23. A device comprising:
at least one processor for executing sets of instructions; and
a memory that stores a computer program for editing audio clips, the computer program comprising sets of instructions for execution by a processor, the sets of instructions for second audio clip:
receiving a selection of a sample audio clip and a selection of a target audio clip, wherein the sample audio clip comprises a sample voice and other audio elements in addition to the voice;
parsing the sample audio clip to determine a sample maximum voice volume in isolation from the other audio elements in the sample audio clip;
determining a target maximum voice volume of the target audio clip;
comparing the sample maximum voice volume of the sample audio clip-to the target maximum voice volume of the target audio clip; and
matching a the target maximum voice volume to the sample maximum voice volume without making a target maximum volume match a maximum volume of the sample audio clip.

24. The device of claim 23, wherein the comparing the sample maximum voice volume to the target maximum voice volume comprises determining a ratio of the sample maximum voice volume to the target maximum voice volume and adjusting the volume of the target audio clip comprises multiplying the volume of the target audio clip by the determined ratio.

25. The device of claim 23, wherein the computer program further comprises sets of instructions for generating a display area for displaying visual representations of soundwaves of the audio clips, wherein a set of user interface tools receives the selections of the sample and target audio clips in said the display area.

* * * * *